Jan. 19, 1943.　　　W. P. LEAR　　　2,308,521
AUTOMATIC RADIO DIRECTION INDICATOR
Filed July 27, 1939　　　7 Sheets-Sheet 7
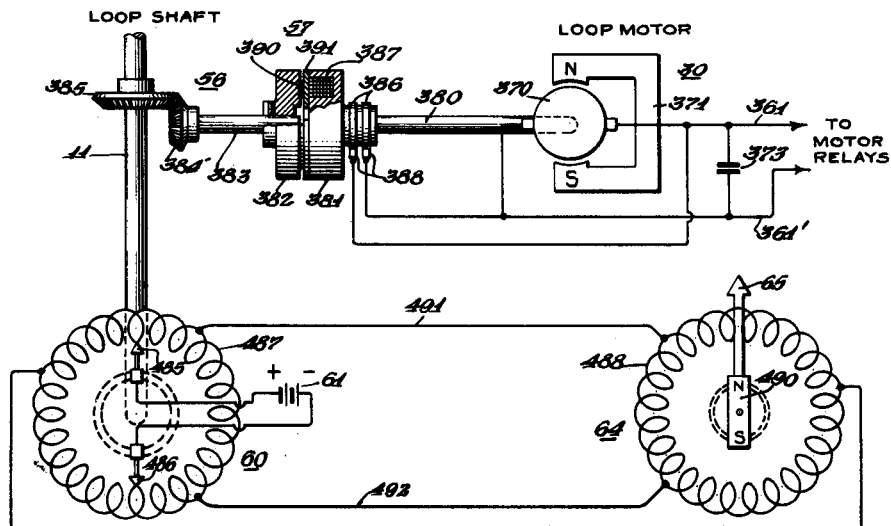
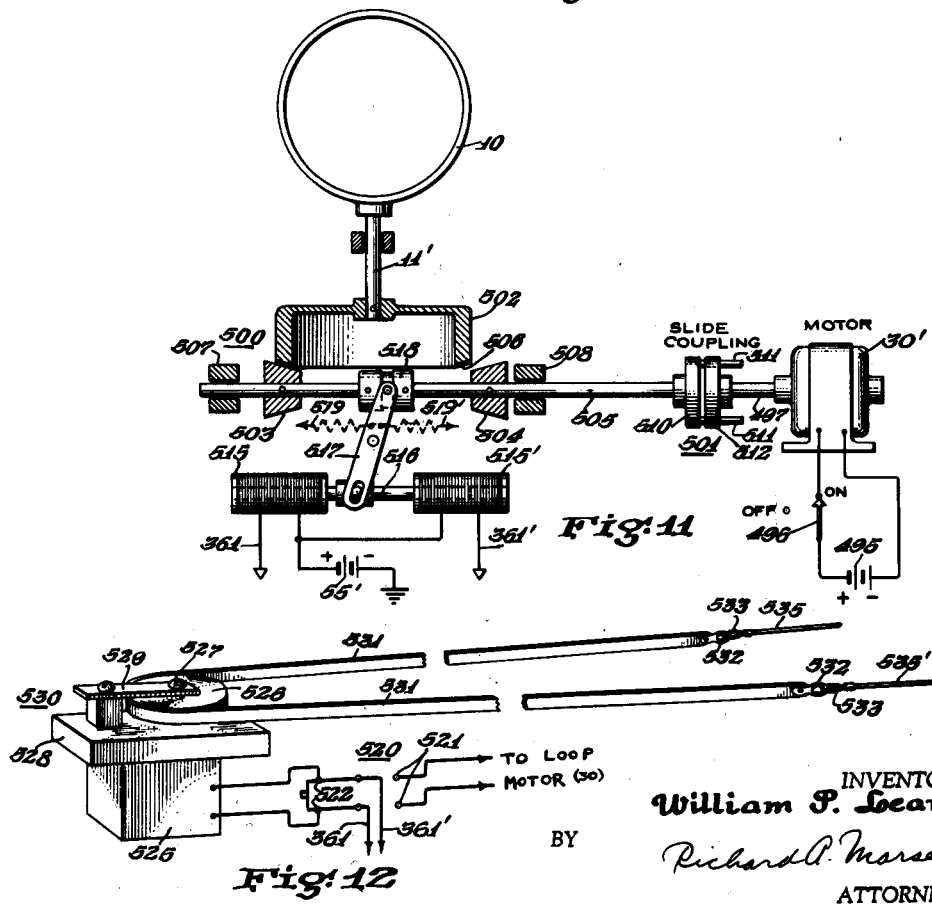
INVENTOR.
William P. Lear
BY
Richard A. Morsen
ATTORNEY.

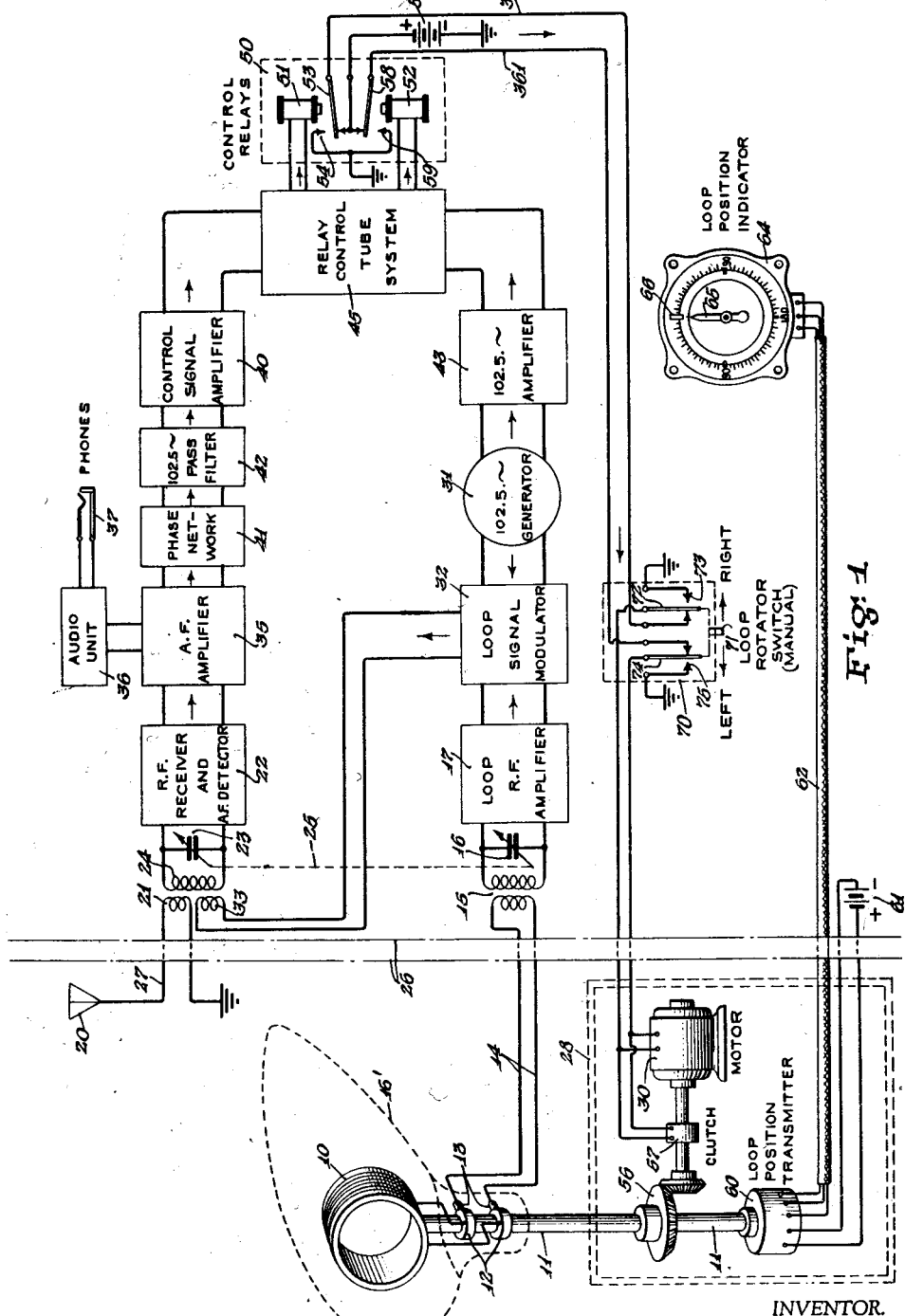

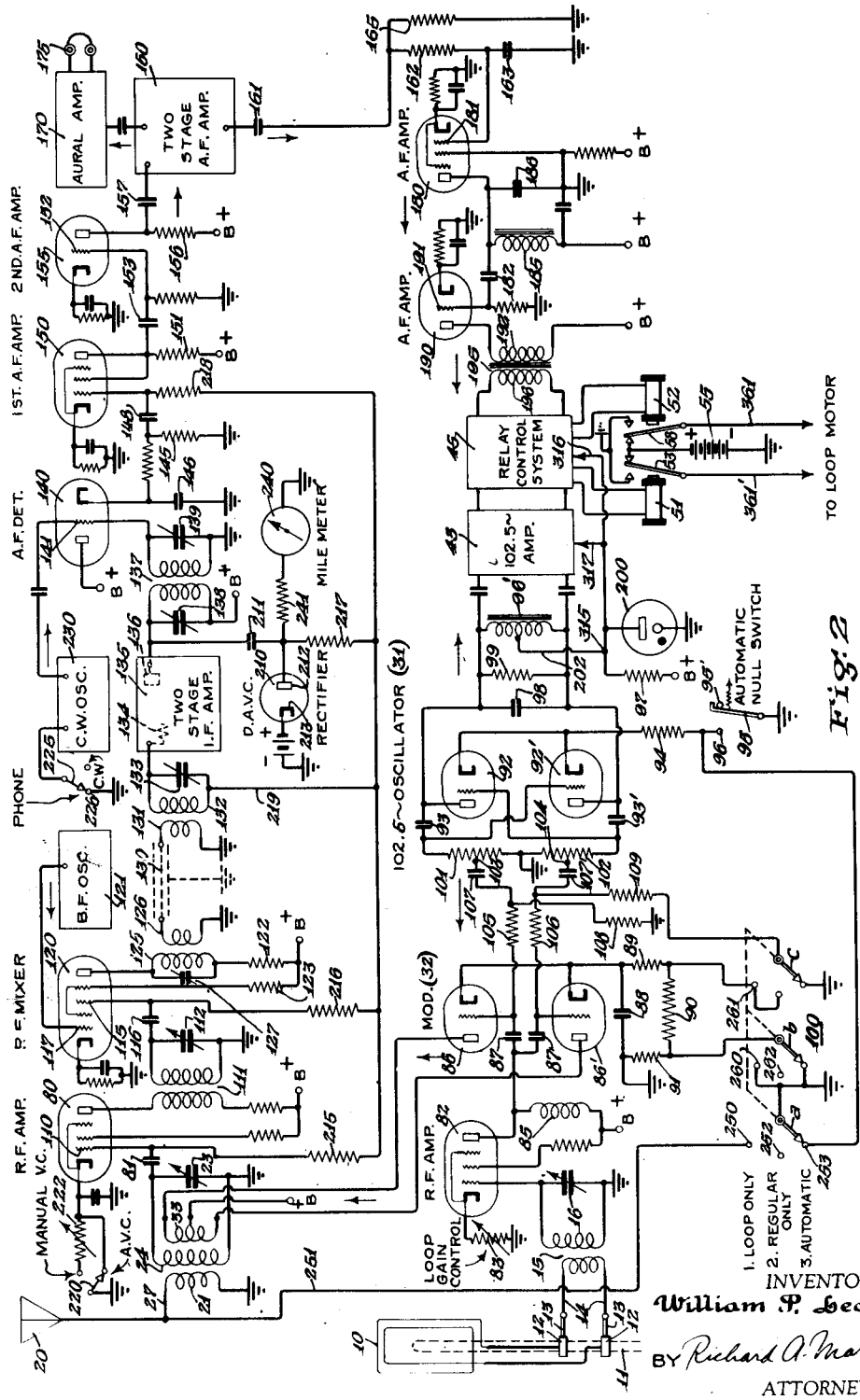

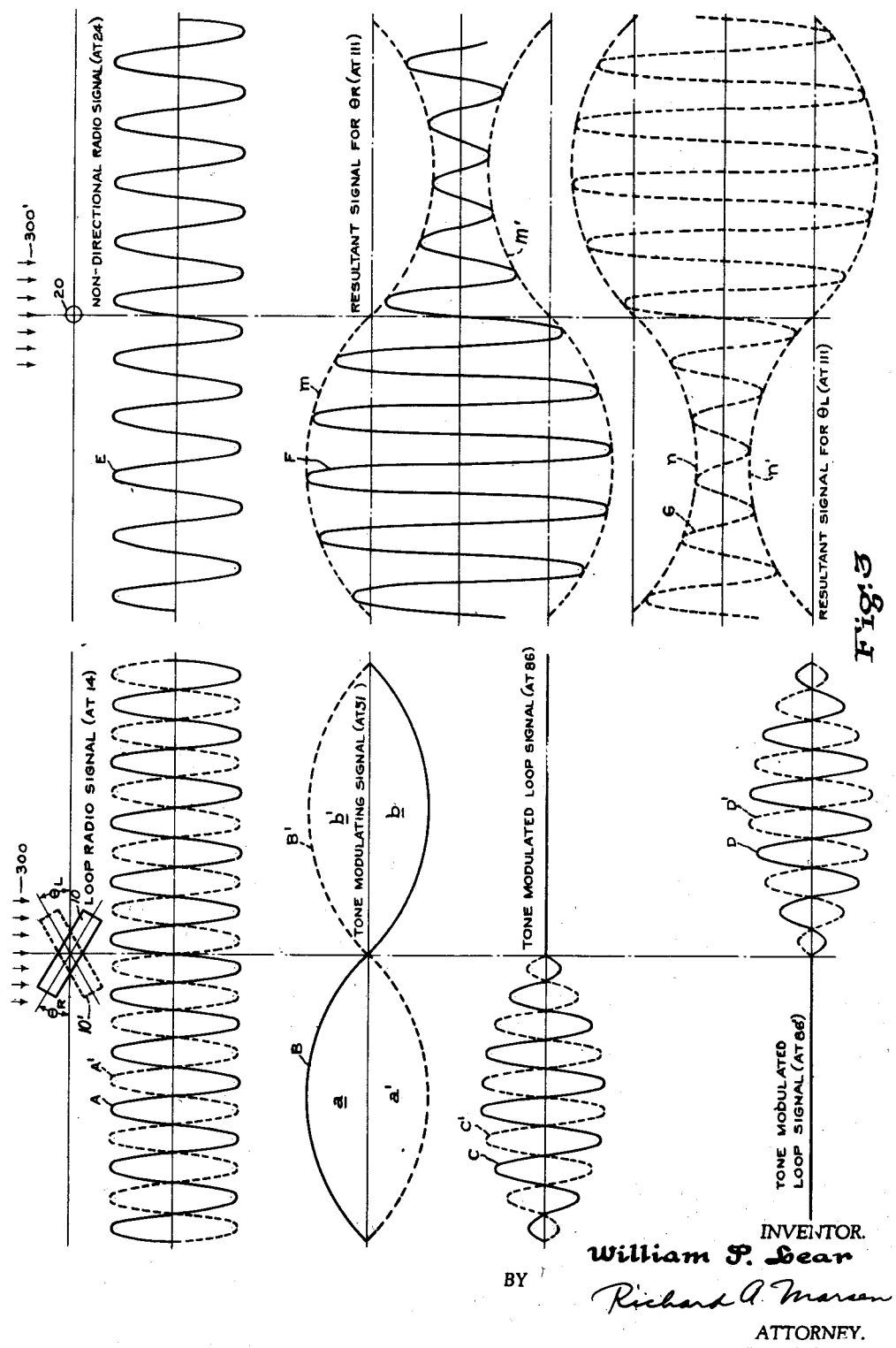

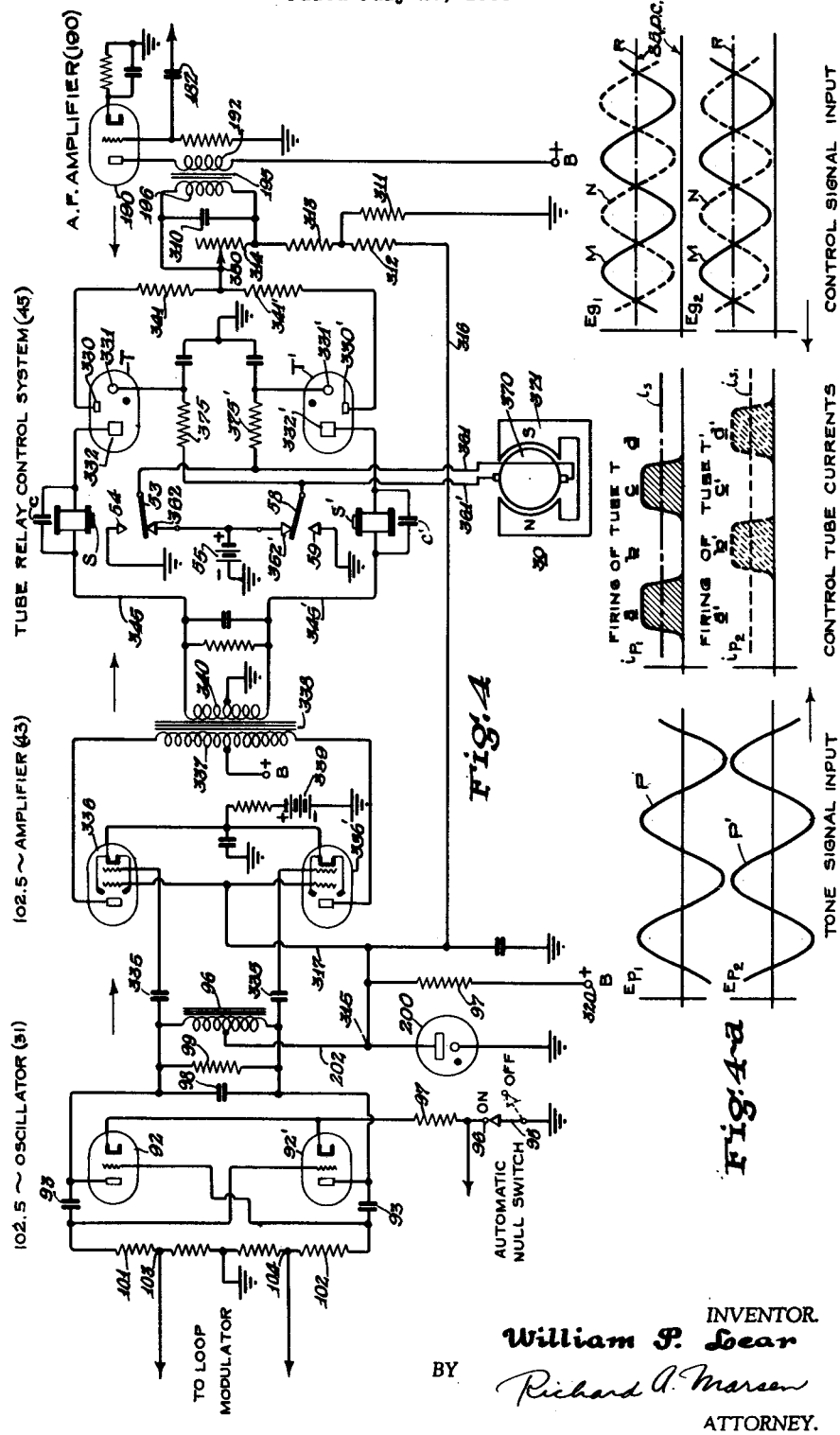

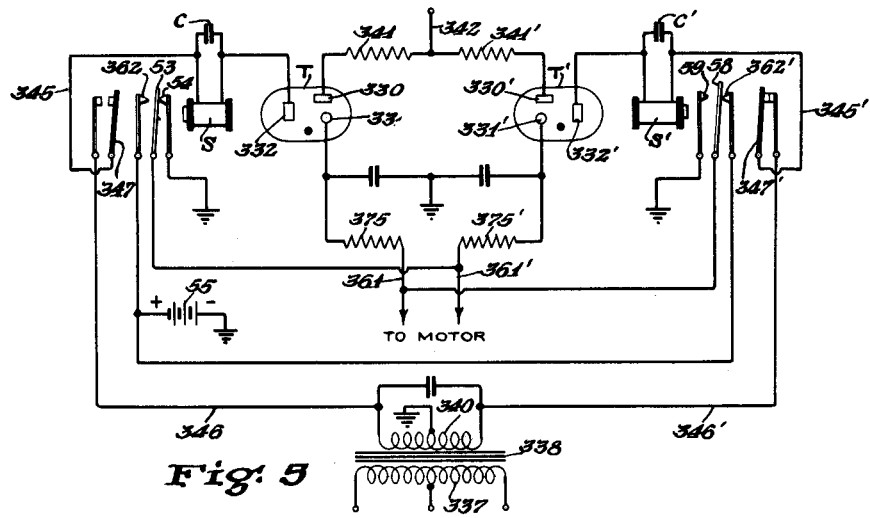
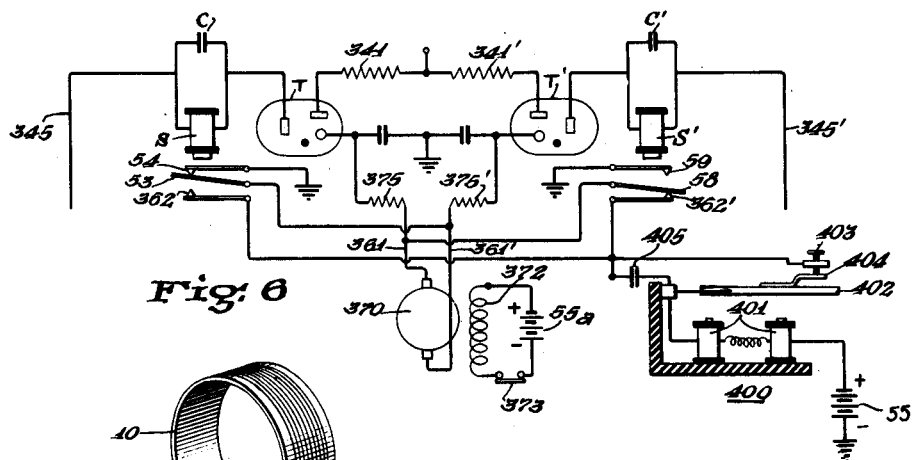
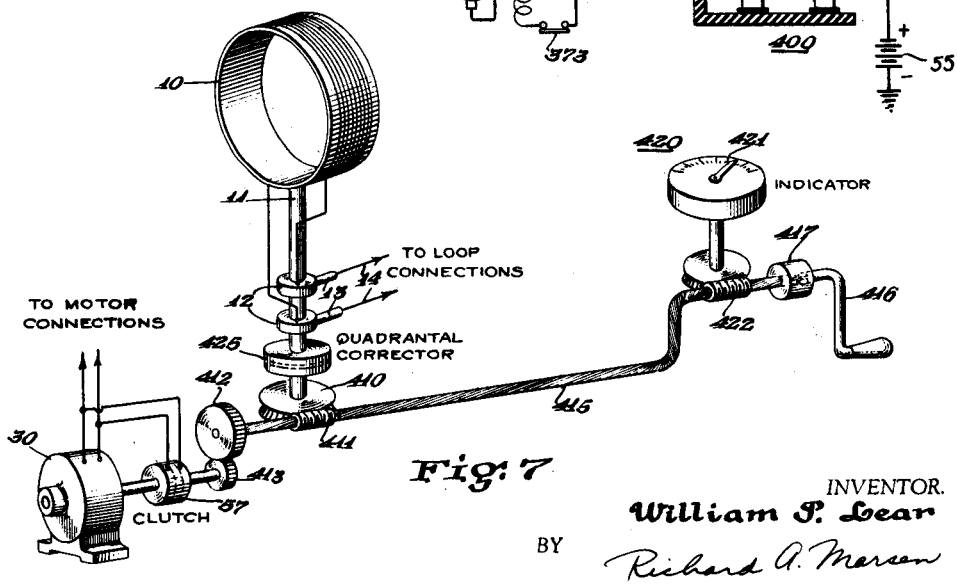

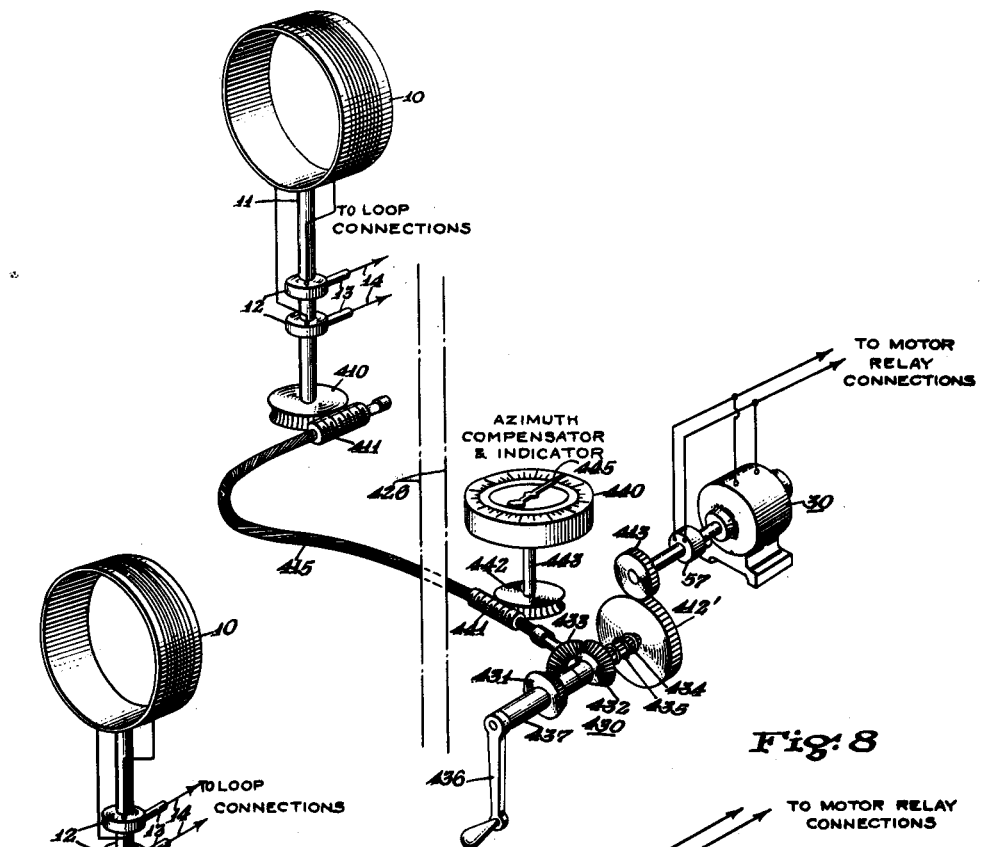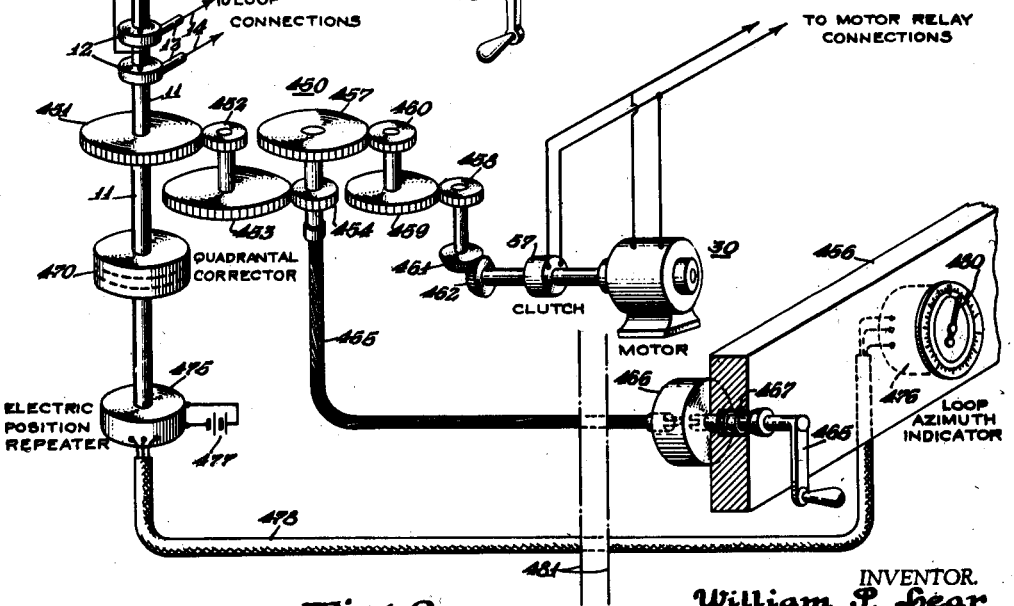

Patented Jan. 19, 1943

2,308,521

UNITED STATES PATENT OFFICE 2,308,521

AUTOMATIC RADIO DIRECTION INDICATOR

William P. Lear, Dayton, Ohio, assignor, by mesne assignments, to Lear Avia, Inc., Piqua, Ohio, a corporation of Illinois Application July 27, 1939, Serial No. 286,733

17 Claims. (Cl. 250—11)

This invention relates to radio direction finders and more particularly relates to improved automatic radio direction indicators useful aboard aircraft and other vehicles or fixed stations to give rapid accurate bearings on radio transmitter stations.

The radio direction finder art dates back as far as radio itself. The oldest reliable radio direction finder is the directional or loop antenna, manually rotated to ascertain the direction of received radio signals. The bearing indications thereof correspond to either the maximum or minimum loop signal positions. Loop antenna directional determinations, however, have a 180 degree ambiguity. The 180 degree directional ambiguity may be eliminated by combining radio signals of a non-directional antenna with those of the directional antenna to produce a cardioid or heart-shaped reception pattern. The use of manual radio directional systems is generally satisfactory aboard relatively slow moving vehicles, such as marine vessels, since the bearings do not change rapidly and the time factor and effort required of the operator in determining the bearings are not important.

The pilot of a high-speed vehicle such as an aircraft, on the other hand, is very busy and taken up in watching and caring for a great number of controls and instruments during flight. Furthermore, the need for an accurate radio bearing instrument is more imperative aboard an aircraft, since storm or fog conditions often preclude other means of navigation. Efforts have long been exerted to develop a system giving rapid foolproof and automatic radio directional bearings to aid the pilot in flight. A marked advance in this art occurred in the 1920's when Deickman and Hell developed an indicating radio system employing a non-directional and a directional antenna successively switched in the radio circuit to cause an indicator to point either to the right or to the left of zero center in accordance with the off-course direction of the aircraft with respect to the direction of the oncoming radio signals. The pilot tuned-in the radio signal, the indicator showed when the aircraft deviated either to the right or the left of the radio signal course, and he could direct the aircraft towards the radio station by maintaining a zero center reading.

Many variations of the oraginal Deickman and Hell cardioid reception pattern switching system have since been evolved, but they all retained its inherent shortcomings. Inaccuracies occur therein due to mistuning, misphasing, voltage changes or other likely operating variations, giving indications which in many instances are on-course when the aircraft is actually flying many degrees off-course. Furthermore, the use of such systems is generally limited to homing or on-course flight, and manual rotation of the loop antenna is required for different directions of flight.

Another general type of aircraft radio guidance system is known as the radio beacon or range. A chain of special beacon transmitters are used to radiate four equi-signal strength zones or courses of interlocked A/N coded signals, or of two tones, the so-called double modulation counterpart thereof. The limitations of such system are well known. In the first place, with the range system only beacon range transmitters may be employed by the pilot for the directional indications. In the second place, when the pilot overshoots an equi-signal zone it is an extremely difficult and at times impossible task for him to retrace his path to the proper course. The courses are limited by the beacon range installations and are not generally useful to the private or independent pilots who travel on different routes. Furthermore, there are directional ambiguities due to the four similar courses provided by each beacon, often becoming a serious source of bearing uncertainty. Greater course flexibility, non-ambiguity, and aural contact with ground stations giving weather reports and location make right-left directional indicating systems derived from the Deickman and Hell principle generally preferred over the range beacon system, even though less reliable in directional accuracy.

Other prior automatic radio direction finder developments depend upon comparisons of relative radio signal phase relations; ratio measurements of the amplitude of two or more radio signal components; or other determinations on signals requiring accurately tuned or balanced circuits to give proper bearing indication. However, ordinarily encountered changes in temperature, humidity variations, mechanical shock, or mistuning to even a small degree, are sufficient to render the indications of such balanced systems grossly inaccurate in practice. Systems have been proposed using cathode ray oscillographs. These, however, are not rugged for aircraft use, require very high auxiliary voltage power supplies, and unduly multiply the number of manual controls for the pilot. Still other systems employing continuously rotating loop antennae, some with electro-optical indicating accessories, have failed in practical aircraft application due to their delicateness, inherent difficulties of operation, and resultant inaccuracies under flying conditions. A few attempts have been made to motor drive a loop antenna to give directional indications in accordance with received radio signals. However, gross insensitivity of the bearings, instability of operation, overdriving and hunting of the motor drive, together with bearing ambiguity or inaccuracy have prevented their adoption in practice.

In accordance with the present invention I provide a rugged, completely automatic, 360 degree radio indicating system which accurately and continuously points out the direction towards oncoming radio signals. With the system of the invention, the pilot may tune-in any radio station for flight in any direction. He maintains his course of flight by simply keeping the indicator pointer on its corresponding bearing position. The accuracy of indication of my system is unaffected by mistuning, wide variations in received signal strengths, temperature or humidity variations, mechanical shocks to the system, voltage supply changes, or other external or internal system disturbances generally encountered in aircraft flight. The directional system of the invention can be readily designed in practice to give automatic bearings accurate to within less than one degree of arc. The instrument can be used for homing or direct on-course flight to the station by simply maintaining the indicator on zero center.

Bearing indications by my system other than on-course are the actual degrees of arc that the aircraft is flying to either the right or left of the radio transmitter. There is no sense ambiguity. The instrument serves as a rugged 360° compass giving a true bearing on the radio station being received. The bearing indications may be effected at the rate of 180° per second or faster. However, I have found that 25° per second is a suitable rate for aircraft work. The bearings are continuous, the indicator needle accurately pointing out the direction towards the transmitter station despite changes in the direction of flight. Aural reception of the messages transmitted by the radio station is continuous, and in no way affects the continuous bearing indications. Important and novel arrangements for overcoming hunting, overdriving or overshooting of the loop motor drive are provided.

In carrying out my invention, I employ a non-directional antenna such as a vertical mast or wire antenna, and a rotatable directional antenna such as a loop. A local tone signal generator is used to modulate the radio signal received by the loop antenna. The tone modulated loop signal is in turn combined with the non-directional antenna radio signal and the resultant introduced to a radio amplifier and audio frequency detector. An audio frequency control signal is derived therefrom, corresponding in amplitude and phase relation to the originally received loop antenna radio signal. The control signal is introduced to a system of tubes and relays arranged for reversibly operating a motor drive mechanically coupled with the rotatable loop antenna. The loop antenna is driven in a clockwise or counter-clockwise direction in accordance with the sense of the radio signal received thereby, bringing the loop to the null signal position.

The rotatable directional or loop antenna is accordingly automatically moved to its geometrical and electrical null signal position with respect to the direction of the transmitter of the radio waves. The magnitude of the control signal thereupon falls below a predetermined amplitude or to zero, bringing the motor drive to a stop or inoperative condition, and holding the loop antenna stationary at null. A telemetering unit is used to show the pilot the angular orientation of the remotely located loop antenna. The indication of the loop antenna's angular position corresponds to the actual bearing on the transmitter of the tuned-in radio waves. A compensator for quadrantal bearing errors due to characteristics of the particular installation is advantageously employed to directly give actual azimuthal readings.

Many significant practical advantages are available to the pilot using the automatic direction indication system of my invention. With a unitary tuning control he readily selects any radio station, being aided by continuous aural reception. The automatic direction indicator then quickly points to the actual angular direction or bearing of the radio station. He then controls his direction of flight to conform with the known direction of the known radio station. The bearing indications by my system have been found to be entirely dependable and foolproof, in commercial application, and are as valuable to the pilot of an aircraft as is the regular magnetic compass to a navigator aboard a marine craft. The bearing indication to the known radio station is in actual degrees of arc with respect to the aircraft's direction of flight. The indications obtained by my system result from an electrical as well as geometric null position of the loop antenna with respect to the oncoming radio waves, and are therefore as accurate as those obtained by the reliable and proven manual loop directional receivers, with the advantage that the bearings are continuous, non-ambiguous, and wholly automatic.

Any type of radio transmitter may be selected for taking the automatic directional bearings, whether voice modulated, code modulated, or continuous wave. By tuning to a second known radio station the pilot can, by simple triangulation, quickly ascertain his exact geographical position. As the pilot flies towards the tuned-in radio station, the directional indication thereon is continuous. When the aircraft passes over the radio station, the indicator immediately reverses by 180 degrees, serving as a marker indication of the station's actual location. In a modification of the present invention used as an instrument approach and landing system, this station marker characteristic eliminates the requirement for separate marker beacon receivers, as disclosed in my copending application Serial Number 291,807, filed on August 25, 1939.

The automatic radio direction indicator system of my present invention employs many novel component features combined to render it absolutely reliable and foolproof under all types of adverse conditions encountered in practical flight. A novel signal level gain control circuit is provided to maintain substantially uniform bearing sensitivity over a wide range of received signal strengths. Means are included for stabilizing the operation of the system against disturbances in the operating voltage supply so as to maintain directional accuracy and sensitivity at all times. A novel switching arrangement is built into the system to permit its conversion to either an aural-null directional system, a loop signal receiver to override precipitation static conditions, a regular non-directional antenna receiver for radio communication and radio range navigation, or an automatic direction indicator. Remote manual rotation of the loop antenna is provided by novel combined mechanical and motor drive arrangements which are particularly useful, if the loop motor fails, or manual radio directional operation or loop signal reception for overriding static is desired.

It is accordingly an object of my present invention to provide a novel radio direction indicator system.

Another object of my present invention is to provide a non-ambiguous 360 degree automatically indicating radio directional system.

Still another object of the invention is to provide a radio direction indicator operable over a 360 degree scale, to automatically give accurate radio station bearings substantially unaffected by mistuning, temperature or humidity changes, mechanical shocks or signal or voltage variations.

A further object of the invention is to provide a novel automatically indicating radio directional system employing a non-hunting motor driven rotatable loop antenna arrangement controlled by a signal derived from the loop antenna reception.

A further object of the invention is to provide novel arrangements for substantially eliminating hunting, overshooting or overdriving by the motor drive for the loop antenna of the automatic directional system.

Still a further object of the present invention is to provide a stable radio directional system having substantially uniform bearing sensitivity over a wide range of received radio signal strengths or variation in operating voltages to give reliable and foolproof operation meeting the exacting requirements of aircraft navigation.

The foregoing and other objects of my invention will be best understood from the following description of exemplifications thereof illustrated in the accompanying drawings in which:

Fig. 1 is a schematic mechanical and electrical block diagram of the components of the automatic radio direction indicator of my invention.

Fig. 2 is a schematic electrical circuit diagram of a directional system embodying the principles of the present invention.

Fig. 3 is a group of curves used in describing the actions of the radio signals in the system.

Fig. 4 is an electrical circuit diagram of the electronic motor control loop circuit.

Fig. 4a is a group of curves used in describing the action of the control signals upon the electronic control tube system.

Figs. 5 and 6 are schematic electrical diagrams of modified forms for the electronic tube relay control circuit.

Figs. 7, 8 and 9 are perspective views of arrangements for operating the loop antenna, through either the motor or manual means.

Fig. 10 is a diagrammatic illustration of details of a motive drive for the rotatable loop antenna, with a preferred telemetering arrangement.

Fig. 11 shows a modified form of the rotatable loop antenna drive.

Fig. 12 is a perspective view of an automatic piloting arrangement employing the automatic directional system of the invention.

Fig. 1 is an electrical block diagram illustrating the coaction of the components entering into the automatic direction finder. A coil wound directional or loop antenna 10 is mounted at the end of rotatable shaft 11, and arranged for free rotation in either direction over the full 360 degrees of arc. The leads of loop antenna 10 terminate in slip rings 12 coacting with brushes 13 for electrical connection thereto. Low impedance cable 14 electrically connects brushes 13 to the primary winding of the loop signal radio frequency transformer 15. Loop antenna 10 is preferably designed with a relatively low impedance or number of turns in order to efficiently receive signal energy over a wide frequency range and transmit the received radio signals to remotely situated radio frequency tuning units. Loop antenna 10 is mounted outside of the aircraft for most efficient signal pick-up. A streamline housing indicated in dotted lines at 16 may be used to protect the loop antenna from wind currents, and external injury, and to minimize its aerodynamic resistance.

A variable condenser 16', in shunt with the secondary of radio transformer 15, is used to tune-in the desired radio station. The magnitude of the tuned-in radio signal impressed upon the input of the loop radio frequency amplifier 17 depends upon the angular position of the loop antenna 10 with respect to the direction of the oncoming radio waves. When the loop antenna is in its null position, with its plane perpendicular to the direction of the oncoming radio waves, no signal is impressed upon transformer 15 of amplifier 17. When the plane of the loop differs from this position, the magnitude of the radio signal impressed upon the input of amplifier 17 increases in accordance with the degree of the off-null position. The phase of the radio signal impressed upon amplifier 17 changes by 180 degrees as the loop passes from either side of its null signal position. Thus, the signal impressed upon loop radio frequency amplifier 17 depends in magnitude and phase upon the relative direction and angular deviation of loop antenna 10 with respect to the direction of the on-coming radio waves. My invention may be practiced with any other known rotatable directional antenna in place of the preferred loop antenna shown, or with a radiogoniometer having a fixed antenna and a rotatable coupling coil.

A non-directional antenna 20 such as a mast, whip, or wire antenna is used to receive the same radio signal as the loop antenna and impress it upon primary winding 21 of the radio frequency transformer coupled to the input of radio frequency receiver and audio frequency detector unit 22. A variable condenser 23 is shunted across secondary 24 of the input transformer for tuning-in the desired radio station. All tuning controls of the system are preferably ganged together as schematically indicated by dotted line 25 connecting tuning condensers 16 and 23. It is to be understood that the several tuning controls of the respective amplifiers and other units of the system are mechanically ganged together to provide a unitary tuning control. It is to be further understood that a plurality of receiving bands may be employed to permit operation of the direction finder over a wide range of radio transmission frequencies. The single loop antenna used is designed to efficiently pick-up radio signals over a wide frequency range, including the higher frequencies. Thus by making the effective height of the loop relatively low, the low inductance thereof will permit efficient reception at the higher frequency end of the frequency range, such as at 2500 kilocycles or higher, and also serve well on the lower frequency range, such as at 250 kilocycles or less.

The tuning controls and indicators of the system are arranged to be placed in the cockpit adjacent the pilot. Antennae 10 and 20 are preferably placed outside the aircraft remotely from the cockpit. Vertical parallel dashed lines 26 indicate a substantial separation of the antennae and associated controls from the radio circuits of the system. Loop transmission cable 14 is designed to efficiently couple the loop antenna with input transformer 15 of the loop radio frequency amplifier. Lead-in 27 from non-directional antenna 20 is preferably unshielded and not placed close to metal structures, in order to keep its capacity to ground as low as possible. A motor drive 30 for loop antenna 10 is mounted adjacent loop shaft 11 in electrically shielded housing 28. A loop position transmitter 60 is mechanically connected to loop shaft 11 for telemetering the angular position of loop antenna 10 to loop position indicator 64 in the cockpit.

An important feature of my present invention is to provide a control signal dependent upon the received loop antenna signal, to operate a motor drive for the loop antenna and rotate it to its null position with respect to the oncoming signals. The normal or stable position of the loop antenna of the system is at the null or electrical neutral position with respect to the oncoming radio signals, giving an exact angular indication of the direction to the transmitter of the radio signals. When the angular position of the loop antenna is changed from null, such as during flight, a radio signal is picked-up by the loop and impressed upon amplifier 17. The magnitude and phase of this signal depends upon the amount of the off-null angular position and the direction to the right or left thereof, respectively. A local generator 31 of an audio frequency current, preferably of the order of one hundred cycles, is used to modulate the radio signals derived from the loop antenna and produce a resultant tone modulated radio signal. I prefer to use a tone signal of 102.5 cycles as indicated in the drawings, but a different frequency may instead be used. Loop signal modulator 32 schematically designates the modulation stage, preferably a balanced modulator, for combining the loop signal of 17 with the tone signal of 31.

The resultant tone modulated radio signal at 32 has a magnitude and sense dependent upon the off-null position of the loop antenna. The tone modulated signal is then suitably combined with the non-directionally received signal from antenna 20 by a coupling means, such as coupling coil 33 linked with secondary winding 24 of the input-transformer to radio frequency receiver 22. The nature of the radio signal impressed upon the input of amplifier 22 will be described in more detail, hereinafter, particularly in connection with Fig. 3. At this point it is sufficient to say that the superposition of the non-directional radio signals with the tone modulated loop signals provides a resultant radio signal bearing the original sound or voice modulations of the transmitted radio wave plus a tone signal component having a magnitude and relative phase dependent upon the off-null position of the loop antenna. Radio frequency receiver 22 may be a tuned radio frequency circuit or the superheterodyne circuit described hereinafter. The receiver unit 22 contains a demodulator or detector for the audio frequency components of the amplified radio signals. The audio frequency signals at the output of unit 22 comprise the sound or voice modulations of the original radio wave plus the tone or control signal obtained when the loop antenna is off-null.

An audio frequency amplifier 35 is connected to the output of receiver-detector unit 22. Amplifier 35 supplies audio unit 36 with sufficient energy for operating headphones connectable to jack 37 at the output thereof. The output of audio frequency amplifier 35 is also connected to a separate control signal amplifier 40 through a suitable phase shifting net-work 41 and tone or 102.5 cycle pass filter 42. The tone signal is thus filtered out from the output of audio frequency amplifier 35 and amplified a substantial degree for use as a control signal to operate the relay control tube system indicated at 45. The relay control tube system is energized by both the control signal from amplifier 40 as well as a correspondingly amplified tone signal obtained directly from generator 31 and intermediate tone amplifier 43. Details of the operation and interrelation of the respective control signals and the relay control tube system 45 will be described in further detail in connection with Figs. 4 and 4a.

Control relays indicated at 50 comprise solenoids 51 and 52 connected to the relay control tube system 45. Solenoids 51 and 52 are selectively energized from control system 45 in accordance with the angular position to the right or left of the null position of loop antenna 10 with respect to the direction of the oncoming radio waves. When relay 51 is energized, it attracts its armature 53 to close the electrical circuit through ground including front contact 54, battery 55, and motor 30. Motor 30 is connected in a predetermined manner to operate in a direction to rotate loop antenna 10 towards its null signal position through its shaft 11 and gearing 56. Energization of either relay 51 or 52 is determined upon the direction of the angular deviation of loop antenna 10 from its null position, so that the proper counter-rotation of motor 30 will occur to bring the loop antenna to the null signal position. Gearing 56, shown as beveled gears, may be a worm and worm gear drive, and preferably has a high reduction ratio.

Relay 51 remains energized until loop antenna 10 is rotated to reach its null position, whereupon the control signal derived from the loop signal impressed upon amplifier 17 is so reduced in value or obliterated as to cause relay armature 53 to drop back to its neutral or back contact position, deenergizing and stopping motor 30. Electromagnetic clutch 57 is electrically shunted across the motor energization circuit to immediately disconnect the motor from the loop antenna, insuring a rapid stop of the loop rotation at the time of motor deenergization, and eliminating the possibility of overshooting or overdriving by the motor due to its mechanical inertia. The frictional forces of gearing 56 and the bearings of the loop are generally sufficient to quickly stop the loop rotation. An electromagnetic brake may be connected for braking the loop upon motor deenergization. The high reduction gearing ratio at 56 minimizes possible overshooting of the loop, since one revolution of the motor causes only a small fractional degree of angular rotation of the loop.

In practice I have constructed systems in accordance with the present invention which automatically operate the loop and therefore the bearing indicator at a rate of 180° and more per second. The accuracy of the resultant bearing may readily be made within 1° of arc, i. e. the actual directional indication on the radio station being correct to within 1° or less. The bearing indications are on a 360° dial and move to the stationary bearing position through the shorter angular path.

When loop antenna 10 reaches, or is substantially at, its null signal position a zero or substantially zero radio frequency signal is impressed upon radio frequency amplifier 17 for modulation at 32 by the generated tone signal from 31. The magnitude of the control signal from amplifier 40 accordingly is also zero, or substantially zero at that time, and control relays 50 are in the deenergized position shown. The loop accordingly remains stationary when it is at its electrical signal null position with respect to the direction of the oncoming waves. This position corresponds to the geometric position of the loop where the plane of the open face thereof is perpendicular to the direction of the oncoming radio waves. Should the aircraft carrying the loop antenna deviate from this direction the loop will be energized by the radio signal and impress it upon amplifier 17 with a magnitude and phase relation corresponding to the altered direction thereof. Should the deflection of the aircraft cause the loop to receive a signal of phase corresponding to that which energizes solenoid 51, the above described operation of motor 30 is repeated to bring the loop to the new null signal position. Should, however, the aircraft turn so that the loop 10 is deviated in the opposite angular direction, the phase of the control signal impressed upon relay control tube system 45 will be different by 180° and energize solenoid 52 instead.

When solenoid 52 is energized, its armature 58 is attracted to front contact 59 to electrically complete the motor 30 circuit including clutch 57, ground, and battery 55. Electro-magnetic clutch 57 is thereupon immediately engaged and motor 30 is rotated in the direction opposite to that corresponding to its energization by solenoid 51. Motor 30 is a reversible one in the present case, and is not necessarily a direct current type. Relay armatures 53 and 58 are arranged so that the direction of current flow through motor 30 is selectively reversed to cause motor 30 to rotate loop 10 towards its null signal position in the shorter path of rotation. Thus, when solenoid 52 is energized, motor 30 will rotate in a direction opposite to that due to energization of relay 51. Clutch 57 becomes engaged and loop antenna 10 is rotated to its null position in a direction opposite to that when relay 51 is energized, which direction is the shorter path of rotation since the signal results from an opposite loop deflection from null.

An important feature of my invention resides in the fact that for any bearing the loop antenna is at its electrically neutral and geometric null position, and remains stationary for the duration of the bearing. Furthermore, as will be shown in more detail hereinafter, no sense or directional ambiguity occurs, and the null position which the loop assumes is accurate for any direction and for any station received. An indicator is secured to the loop antenna for pointing out its direction and gives a true reading of the bearing on a radio station. The loop antenna is generally placed remote from the cockpit. A telemetering arrangement is connected to the loop antenna and a remote 360 degree indicator is provided to show the pilot the exact angular position of the loop at any time.

The telemetering system diagrammatically shown in Fig. 1 comprises a loop position transmitter 60 mechanically secured to loop shaft 11.

A direct current Selsyn type telemetering system is suitable for this purpose, and is described in more detail in connection with Fig. 10. A mechanical remote indicating system is shown and described in connection with Figs. 7, 8 and 9. Loop position transmitter 60 is energized by direct current source 61 and is connected by three-wire cable 62 to remote loop position indicator 64 mounted in the cockpit adjacent the pilot. Pointer 65 of indicator 64 moves in exact correspondence with loop antenna 10, and is arranged to point to the center zero position 66 shown on the dial, when the axis of loop 10 is parallel to the axis of the aircraft, i. e. when the open plane of the loop is perpendicular to the direction of flight of the aircraft.

When pointer 65 is at its center zero position shown, the direction of the oncoming radio waves as received by the system is directly in line with the aircraft, the position of the radio station corresponding to the center zero reading being directly ahead or on-course with respect to the direction of flight. When the aircraft deviates from on-course and flies toward the left of the transmitter station, the loop antenna will receive a radio signal which causes the generation of a control signal to operate either of control relays 51 or 52 to immediately return the loop antenna to the null position with respect to the direction towards the transmitter station. Indicator needle 65 accordingly is moved to continuously point towards the fixed ground station.

A deviation of flight towards the left of the station will cause the needle to deflect towards the right of zero point 66 by an equal number of degrees of arc. For example, should the aircraft deflect 10 degrees off-course the needle 65 will immediately rotate 10 degrees toward the right and the pilot will immediately be apprised of his new course with respect to the radio station. Center zero 66 corresponds to the direction or the course of flight, and the angular position of needle 65 corresponds to the actual direction to the radio station with respect to the direction of flight. Conversely, should the pilot deflect his aircraft 10 degrees towards the right of the direction to the radio station, needle 65 will then deflect 10 degrees towards the left. The pilot thus need merely remember that indicator needle 65 exactly points out the actual position of the radio ground station. He then simply maneuvers his aircraft to adjust his angular direction of flight with respect to the direction to the radio station. The accuracy of indication is independent of the position of indicator needle 65 since any reading thereof corresponds to an electrical null position of the loop, and no balancing of electrical parameters or signal components are required to maintain the readings. It is thus possible for the pilot to fly at any desired angle with respect to a radio station by merely maintaining the indicator needle 65 at that angular position on the dial.

A manual loop rotator switch 70 is provided to permit the pilot to rotate the loop independently of the automatic direction finder control. Thus when the equipment is used as a manual direction finder or when voice reception is desired on the loop alone during static conditions, (which operation may be effected by the selector switching arrangement 100 shown in Fig. 2), the pilot operates button 71 of the rotator switch for direct control of the loop position. When button 71 is pressed towards the right, armature 72 thereof is connected to ground through contact 73. Motor 30 together with clutch 57 is energized from battery 55 to cause loop 10 to rotate in a corresponding direction. Similarly, when button 71 is pushed towards the left, and armature 74 thereof is connected to ground through contact 75, the motor is made to rotate loop 10 in the opposite direction, independently of the operation of the automatic direction finder circuit.

It is to be understood that different forms of automatic control may be used for the rotation of loop antenna 10 by means of the control signal generated in accordance with the magnitude and phase of the signal received by the antenna 10. Reversible motor 30 in combination with clutch 57 and gearing 56 is a simple practical form which I have chosen for illustrative purposes. Motor 30 is preferably a reversible direct current permanent field magnet motor operable from a local power source, such as from the 12 volt battery supply of the aircraft. Preferred circuit arrangements for driving the loop antenna in accordance with the control signal will be described in connection with Figs. 4, 5 and 6. In some installations, mechanical control of the rotation of loop antenna 10 is indicated. Such arrangement permits the pilot to remotely control the loop antenna should the electrical motor fail for any reason. Such systems are hereinafter described in connection with Figs. 7, 8 and 9.

Fig. 2 is a schematic electrical circuit diagram, partially in block form, illustrating electrical details of important features comprising a practical automatic direction finder system constructed in accordance with the principles of my present invention. Non-directional antenna 20 is connected to primary winding 21 of the radio frequency input transformer, the secondary winding 24 of which is coupled to the control grid electrode of radio frequency pentode amplifier 80 through coupling condenser 81. Secondary winding 24 is shunted by a variable tuning condenser 23. Tertiary winding 33 is coupled to winding 24 for simultaneously impressing therein the tone modulated loop radio frequency signals emanating from loop signal modulator 32.

The rotatable directional antenna 10 is preferably one similar to that described in connection with Fig. 1. A low impedance type loop antenna is used with both sides balanced to ground. Satisfactory directional reception is feasible over a radio frequency range from as low as 180 kilocycles up to 2800 kilocycles using a single loop antenna of about 20 microhenries inductance. Such loop antenna preferably has a 20 ohm impedance at the lower frequency, and a 400 ohm impedance at the higher frequency. Loop transmission cable 14 has a capacitive reactance and aids in the efficient tuning and reception of the radio signals by the loop antenna. A transmission cable having a capacitance of about 600 micro-microfarads is suitable for use with the 20 microhenries loop antenna, and connects the loop antenna to the input of loop amplifier stage 82. Due to the low impedance of the loop and proportionally low capacity cable 14, it is possible to use an exceptionally long loop cable without serious radio transmission loss.

Signals from rotatable loop antenna 10 are picked off from slip rings 12 by brushes 13 and electrically connected to the primary of radio frequency transformer 15 through transmission cable 14. Radio frequency transformer 15 is of the highly efficient and electrically shielded type. A powdered iron core may be used for the radio frequency transformers of the system as well as for the intermediate frequency transformers.

The secondary winding of loop transformer 15 is shunted by tuning condenser 16. The output of loop transformer 15 is connected to the control grid electrode of radio frequency amplifier pentode 82 for further amplification and introduction to the control grids of balanced modulator stage 32. The gain of loop amplifier 82 is manually controllable by rheostat 83 connecting the cathode thereof to ground. The anode of amplifier 82 is energized through a shunt radio frequency choke coil 85 connected to the B supply. The output of loop amplifier 82 is coupled to the control grids of tubes 86, 86' of modulator 32 through coupling condensers 87, 87'. The cathodes of tubes 86, 86' are tied together and connected to ground through by-pass condenser 88 and a biasing resistance net-work 89, 90, 91 controlled by selector switch 100 to be described. An audio frequency oscillator 31 comprising two triodes 92, 92' is arranged to generate an audio or tone frequency current of a relatively low frequency. The control grids of triodes 92, 92' are coupled to the anodes thereof by condensers 93, 93'. Cathodes of the oscillator triodes are tied together and connectible to ground through biasing resistor 94.

Oscillator 31 is normally operative when the circuit of biasing resistor 94 is completed to ground. A ground connection therefor is afforded when selector switch 100 is in position three (3) for automatic direction indicator operation. An "automatic null" switch 95 is provided to connect biasing resistor 94 to ground when selector switch 100 is not at position 3, but for example at position 1 for reception at "loop only." Switch blade 95 is normally mechanically biased away from contact 96. By manually pressing blade 95 at for example 95', against contact 96, oscillator circuit 31 is completed and a tone signal is generated for automatic loop rotation control operation. Thus, the pilot can effect automatic null operation during "loop only" reception, with bi-directional ambiguity resulting in this case. The B supply for the anodes of oscillator triodes 92 is arranged through a center-tapped inductance 96' connected to the B supply through resistor 97. A condenser 98 and resistance 99 are shunted across inductance coil 96 and together predetermine the frequency generated by oscillator 31. Resistors 101 and 102 are coupled between the grid electrodes of triodes 92 and ground. Intermediate taps 103 and 104 on respective resistors 101 and 102 couple a portion of the available alternating current tone energy from oscillator 31 to the grids of modulator triodes 86, 86' through coupling resistances 105, 106, of about one megohm each and through coupling condensers 107, 107'. Further resistances 108 and 109 normally connect grid coupling resistors 105 and 106 to ground to stabilize the grid circuits thereof.

The actual frequency of the tone current generated by oscillator 31 as used in the system is optional, and may for example lie anywhere in the audio frequency spectrum, or even higher. Practically, however, the tone frequency should be chosen so as to efficiently pass through the respective radio frequency circuits as sidebands, and the audio frequency circuits as well, and also be audible to the pilot when present. It is also desirable to prevent interference with the intelligibility of the aural messages of the radio signals. An important consideration is to minimize any effect due to the sound modulations of the radio wave upon the control circuit. I have found that a control signal in excess of 200 to 300 cycles contains sound modulation components after filtering out for control purposes. Modulation "kicks" occur when the sound frequencies of the radio signals coincide with the control frequency, and interfere with the stability of the directional indications.

A tone frequency of the order of 100 cycles is sufficiently high to efficiently pass through the radio and audio frequency channels of the system, sufficiently low to not interfere with the intelligibility of the audio frequency modulations of the radio signal, and is not affected by modulation kicks. A practical tone frequency in this range is 102.5 cycles, as indicated in the drawings. It is to be understood that the principle of my invention is not limited to the particular tone or control frequency, but that the 102.5 cycle tone is a very useful one for commercial piloting since it is efficiently amplified through the system, is distinctly audible when present in the audio frequency channel, does not interfere with the intelligibility of speech, and is not subject to modulation kicks for control purposes.

Control grid electrodes of modulator triodes 86, 86' accordingly simultaneously receive the audio frequency tone signal from oscillator 31 and the radio frequency signal picked up by directional antenna 10. The electrical interaction of the respective signals is described in connection with Fig. 3. The output of modulator stage 32, obtained through the anodes of tubes 86, 86', is connected to opposite sides of radio frequency winding 33 coupled to secondary winding 24 of the non-directional antenna circuit. The anode supply for modulator tubes 86, 86' is obtained through a center tap on winding 33 connected to the common B supply as indicated. The wave form of the resultant radio frequency signal imparted by winding 33 to secondary 24 corresponds to that indicated by curves C, C' and D, D' of Fig. 3, or zero when loop antenna 10 is on null. The frequency of the loop modulated signals is the sum and difference of the received radio signals and the low frequency oscillator tone signal. The simultaneous induction of the non-directional radio frequency signals with the tone modulated loop signals upon winding 24, produces a resultant signal upon control grid 110 of radio frequency amplifier 80 of wave shape corresponding to curves F or G. The non-directional signal from antenna 20 serves as a reference signal or sense determinator, so that the right or left sense of the loop antenna signals is established for further control action on the loop antenna. Thus proper functioning of the automatic directional system is assured, bringing the loop antenna back to its null signal position to give accurate indications.

The signals impressed upon the control grid of radio frequency pentode 80 are amplified and transmitted through output radio frequency transformer 111 having its secondary winding tuned to resonance by variable condenser 112 shunted thereacross. The output of transformer 111 is coupled to intermediate grid electrode 115 of the radio frequency mixer stage 120 through coupling condenser 116. Radio frequency mixer 120 is shown as a hexode wherein grid electrode 117 adjacent to the cathode is energized by a signal emanating from a local beat frequency oscillator 121 operated in the usual manner for superheterodyne reception. The showing of beat frequency oscillator 121 in block diagram form is believed sufficient, it being understood that the beating frequency is controlled by a unitary tuning means connected with the variable tuning condensers of the radio frequency circuits. The anode and screen grid operating potential is supplied through respective resistors 122, 123.

The output of radio frequency mixer stage 120 comprises primary winding 125 of a step-down intermediate frequency transformer shunted by adjustable condenser 127 for resonating the coil at the intermediate frequency, such as 455 kilocycles. Transformer 125, 126 is a step-down transformer so that a long low impedance transmission line 130 may be used to permit placing the intermediate frequency and audio frequency amplifier equipment remote from the radio frequency section including the directional and non-directional radio signal amplifiers, and the loop modulator stage. This arrangement also makes it feasible to utilize the radio frequency and intermediate frequency sections with much higher gain than with the conventional combined type of construction. Transmission cable 130 is an electrically shielded low impedance cable, which may well be 12 feet in length, terminating in a correspondingly low impedance primary winding 131 of step-up intermediate frequency transformer 131, 132. Secondary winding 132 of the terminating transformer is shunted by a resonating adjustable condenser 133 to tune the transformer to the intermediate frequency used.

The output of step-up intermediate frequency transformer 131, 132 is connected to the grid electrode indicated at 134 of the input stage of two-stage intermediate frequency amplifier 135 shown in block diagram. The anode indicated at 136 of output stage of intermediate frequency amplifier 135 is connected to transformer 137, the primary and secondary windings of which are respectively shunted by adjustable condensers 138 and 139 and tuned to the intermediate frequency. An audio frequency detector stage 140 has its control grid 141 connected to the output of intermediate frequency transformer 137 for demodulating the signals and produce corresponding audio frequency currents across cathode resistor 145 connected to ground. Both the radio signal modulations as well as the tone or control signal if present, produce the corresponding audio frequency signal across resistor 145 by the detector action. The anode of detector 140 is connected to the common B supply as indicated. Condenser 146, between the cathode of detector 140 and ground, by-passes the higher order frequency currents from the audio frequency path.

The audio frequency signals are coupled to audio frequency pentode amplifier stage 150 by coupling condenser 148. The anode circuit of amplifier 150 comprises resistance 151 connected to the common B supply and is coupled to the control grid 152 of a second audio frequency amplifier stage 155 through coupling condenser 153. Second audio frequency amplifier stage 155 is resistance-capacity coupled by anode resistor 156 and coupling condenser 157 to a further two-stage audio frequency amplifier 160. It is to be understood that both the original audio frequency signal modulations and the control or tone signal amplified together therewith, are impressed upon two-stage amplifier 160 for further amplification to an appreciable signal level. The output of amplifier 160 is coupled to the aural amplifier indicated at 170, to the output of which earphones 175 are connected. The pilot adjusts the aural level of the signals by a separate manual control in aural unit 170. The output of audio frequency amplifier 160 is also coupled to further amplifier stages 180 and 190 for selecting and further amplifying the control signal and impressing it upon relay control system 45.

The output of audio frequency amplifier 160 is coupled to the control grid of amplifier stage 180 by coupling condenser 161 and phase shifting network 162, 163. Resistor 165 is shunted across phase shifting network 162, 163 connecting the control grid of stage 180 to ground. The relative impedances of resistor 162 and condenser 163 is chosen to suitably shift the phase of the control signal to be impressed upon control grid 181 to compensate for any misphasing thereof caused in the circuits prior to that point. Such phasing is made to cause the phase relation of the signal arriving at the input of tube relay control system 45 to be substantially in-phase or 180 degrees out-of-phase with the correspondingly impressed tone signal from amplifier 43.

Phase shifter network 162, 163 may assume other forms than the simple one shown, or be positioned at another part of the circuit. In practice, negligible relative phase shift of the 102.5 cycle tone occurs due to its passing through the amplifier and detector circuits, some phase shifting however occurring at loop signal modulator 32 due to attenuation through resistors 105, 106. The purpose of phase shifter network 162, 163, schematically indicated at 41 in Fig. 1, is to compensate for phase shifts with respect to the reference phase position as determined by the tone signal at oscillator 31, to insure the arrival of both the control signal and reference tone signal upon control system 45 in substantial phase or 180 degree out-of-phase relation for maximum effect. The control action on system 45 is described in detail in connection with Figs. 4 and 4a.

The control signal impressed upon control grid electrode 181 of pentode amplifier stage 180 is amplified in a conventional manner. The output of amplifier 180 is impressed upon control grid 191 of a further amplifier stage 190 through coupling condenser 182. A tuned filter 185, 186 is used to filter out other signals or modulations, and most efficiently pass the signal frequency corresponding to the control signal, namely 102.5 cycles. Other filter arrangements than the shunt choke coil 185 and condenser 186 may be used. The function of filter 185, 186, which corresponds to pass-filter 42 shown in Fig. 1, is to substantially reject other frequencies but efficiently pass and amplify the control signal frequency. Amplifier stage 190 comprises a triode tube, the anode circuit of which includes primary winding 192 of audio frequency coupling transformer 195. Secondary winding 196 of transformer 195 is shown schematically coupled to the input of the relay control system 45. The output of 102.5 cycle amplifier 43 is impressed upon relay control system 45. Figs. 4, 5 and 6 are preferred circuit arrangements for the relay control tube system 45.

As described hereinabove in connection with Fig. 1, solenoids 51 and 52 are individually and selectively energized in accordance with the angular relation of loop antenna 10 to either the right or left of the direction of the oncoming radio waves to rotate the motor connected to loop antenna 10 and automatically return the loop to a null position with respect to the direction of the radio waves. Several important features in the embodiment of my invention combine to render it practical and commercially useful. Thus, for example, wide variations in the level of the received signals are compensated by a novel system of automatic level control to maintain the sensitivity of operation substantially uniform. Another important arrangement includes a system for maintaining the anode or B voltage supply for critical parts of the circuit constant despite variations in the supply voltage thereto, to insure uniform sensitivity and operation of the motor control and relay system. A voltage regulator tube 200 is connected between a particular point 315 and ground, to maintain a predetermined and uniform operating voltage supply for the critical part of the control system which includes the anodes of oscillator stage 31 through lead 202, the amplifier 43 through lead 317 and relay system 45 through lead 316 as will be explained in more detail in connection with Fig. 4.

An automatic level or volume control arrangement is provided for the direction indicator circuit by rectifier 210 fed by an intermediate frequency signal tapped from intermediate frequency output anode 136 through coupling condenser 211 to anode 212 thereof. Delayed automatic volume control (D. A. V. C.) action is obtained by providing a positive biasing voltage raising the potential of cathode 213 to delay the biasing control action till the received radio signals reach a predetermined level. Anode 212 of rectifier 210 is connected to the control grids of the respective radio frequency, intermediate frequency and audio frequency stages of the circuit to establish a substantially flat and uniform amplification response of the signals through the system. Coupling resistances 215, 216, 217, 218 are used in the level control circuit, and control grid 134 of the intermediate frequency amplifier is connected by direct connection 219 through secondary winding 132. The second stage of the intermediate frequency amplifier 135 is preferably also controlled by the level control circuit described.

The inclusion of at least the first audio frequency amplifier stage 150 in the signal control circuit from rectifier 210 is an important advantage in the system of the invention since it results in a very flat overall response despite wide signal level changes in the received radio waves. Since the direction finder is operated on radio stations of all types and powers, and at widely different distances from them, I have found such a level control circuit extremely practical. The level or amplitude of the actuating control signal impressed upon control system 45 can accordingly be predetermined for a given installation and design of the equipment. This is an important and useful factor, since the principle of automatic operation of the present invention is dependent upon a change in phase relation of the control signal. When the amplitude of the control signal is maintained within a narrow range over widely different operating conditions, the phase comparisons are more critical. I have found that the automatic volume control circuit, including inverse amplification control of at least one audio frequency stage, greatly extends the range, particularly at the higher levels of received signal strengths, in which uniform control operation is effected. The automatic volume control arrangement shown and described, taken in conjunction with the anode supply voltage regulator system connected in the voltage sensitive region of the system, combine to render the operation of my system extremely stable in practice despite the rigors of aircraft navigation and operation.

A manual switch 220 is provided at the cathode of the first radio frequency amplification stage 80 to counteract the automatic volume control effected through resistor 215, for manually controlling the bias through variable resistor 222 in the cathode circuit. The manual volume control is useful for communication or reception of radio range signals. A second volume control is optionally provided in aural amplifier 170 to permit adjustment of the level in earphones 175 independently of the system. Loop signal gain control 83 is provided, as already described, to adjust the sensitivity of the loop signal and directional indications in general.

A further switch 225 is provided for continuous wave beat frequency oscillator 230 to connect it to audio frequency detector stage 140 for heterodyning continuous waves. Continuous wave oscillator 230 is used for receiving continuous wave transmission and serves as a signal "station finder" for locating weak or distant radio stations. The tone of the heterodyne beat note is varied by adjusting a component such as the inductance or capacitance of the oscillator circuit of 230. The normal connection of switch 225 to ground contact 226 is schematically indicated for rendering oscillator 230 ineffective as a heterodyning means, which connection is used for phone reception. By ungrounding switch 225, oscillator 230 becomes effective for heterodyne reception of continuous waves.

A further useful circuital element of the invention comprises direct current milemeter 240 connected between the output of automatic volume control stage 210 and ground, through series resistance 241. Meter 240 serves as a measure of the automatic biasing current and indicates the relative signal strengths of the received radio signals. Meter 240 serves as a relative distance or milemeter. Flight toward a station increases the signal strength and therefore the indication on meter 240. Flight away from a station correspondingly decreases its indications. Milemeter 240 is a very useful device for the pilot and is located in the cockpit. Besides, its function as a relative distance meter for judging the approximate distance of the aircraft to the radio station, it may be used as a very positive, accurate, and reliable means of determining the null position when the loop antenna alone is used for bi-directional compassing during precipitation static conditions. Minimum dip of meter 240 will correspond to absolute aural-null of the loop antenna. Another use for instrument 240 is as a tuning indicator to show when a radio station is properly tuned in. This is significant for a highly selective receiver such as the direction finder circuit design. Meter 240 has a further use in indicating when the pilot is passing over a broadcast station by giving a pronounced dip when directly over a station using a vertical radiator. The needle 65 of automatic direction indicator 64 will reverse its indication by turning around 130 degrees from its reading as soon as the aircraft passes beyond the radio station.

An important feature of the direction finder circuit shown in Fig. 2 is the three-way selector switch 100 to effect different modes of operation of the system. Using three position switch 100, the pilot may quickly connect the circuit for operation on: (1) "loop only," as a visual null, aural null, or minimum signal type of direction finder, or for loop reception during precipitation static conditions; (2) "regular only," wherein the non-directional antenna is used for communication and radio range navigation; or (3) "automatic" direction indicator.

When switch blades $a$, $b$, $c$, of selector 100 are moved to position 1 corresponding to "loop only" reception, contact 250 is grounded through blade $a$. Contact 250, connected directly to non-directional antenna 20 through lead 251, short circuits the non-directional signals and renders them ineffective. At the same time the cathode circuit of oscillator tubes 92, 92' are ungrounded since blade $a$ is removed from contact 253. No tone signal is then impressed upon modulator stage 32. Should the pilot desire automatic rotation of the loop to null, he presses switch 95 against contact 96 completing the cathode circuit to ground.

A null indication in the "loop only" position is bi-directional, but useful when precipitation static conditions are encountered in flight. By turning the loop near its maximum signal reception position, communication reception is feasible. By viewing meter 240 the pilot can obtain reliable directional determinations by the minimum or maximum signal strength positions. Biasing resistor 91 remains shorted to ground through switch blade $b$ and contact 260. Grid resistor 109 of modulator tube 86' is disconnected from ground and connected to an intermediate biasing potential at resistors 89 and 90 through contact 261. Such connection of resistor 109 decreases the negative bias between the grid and cathode of tube 86'. Section 86' of modulator 32 is accordingly rendered more sensitive for signal amplification than tube 86 which normally is biased near cut-off. The loop signals are accordingly amplified through section 86' and impressed upon radio frequency amplifier stage 80 by coupling coil 33 and through the remainder of the system.

With selector switch 100 in position 2, non-directional antenna 20 normally impresses radio signals upon the system, switch blades $a$ and $b$ being connected to intermediate contacts 252 and 262 respectively. Resistor 91 is unshorted and is effective in substantially increasing the biasing voltage upon modulator stages 86, 86'. The total value of the resistance placed in the cathode to ground circuit for modulator 32 is designed to be sufficiently large to over bias the modulator tubes 86, 86' and prevent the passage of loop radio signals or any tone frequency. Cathode resistor 94 of oscillator stage 31 remains ungrounded since contact 253 is unconnected. An electronic method is thus provided for disabling the automatic direction indicating action without the use of radio frequency switching. The result is to provide reception by the system as a radio receiver without any directional characteristics. With selective switch 100 in position 2, the pilot uses the system as a sensitive communication receiver or for radio beacon range reception.

With selector switch 100 in position 3, the biasing of modulator stage 86, 86' is returned to normal by short-circuiting resistor 91 through switch blade $b$, properly biasing oscillator 92, 92' by connecting biasing resistance 94 to ground through switch blade $a$, and normally grounding grid resistor 109.

General theory of the radio circuits

The operation of the automatic direction indicator of the invention will be better understood by a consideration of the following theory in connection with the curves of Figs. 3 and 4a. The oncoming radio wave is indicated by arrows 300 directed toward the loop antenna. The loop antenna indicated in solid at 10 is tilted towards the right of the direction of the radio waves, forming angle $\theta_R$ with the horizontal axis. When the open plane of loop 10 is in a horizontal position, namely perpendicular to wave direction 300, it receives no signal. The magnitude of the radio signal picked up by loop antenna 10 is dependent upon its off-perpendicular or off-course angular relation, and is proportional to the sine of this angle. Curve A indicates a radio carrier wave corresponding to the received loop radio signal, and may be said to correspond to the $\theta_R$ position of the loop.

When the loop antenna is in the position indicated in dotted lines at 10', deflected toward the left of radio wave direction 300, it forms a corresponding angle $\theta_L$ with the perpendicular direction thereto. The radio signal indicated by dotted curve A' corresponds to reception in this position. It is well known that when the loop antenna passes through its null or perpendicular position, the phase of the resultant signal reverses by 180 degrees. This is illustrated by the phase difference of 180 degrees between radio signal curves A and A'. The amplitude of radio signal curves A and A' are shown equal, and is so when $\theta_R$ equals $\theta_L$. Modulations of the radio wave are not shown, but are to be understood. Curves A and A' correspond to the carrier. The frequency of the signal indicated by curves A and A' is at radio frequency such as 200 kilocycles, 1000 kilocycles, 3000 kilocycles or the like. Signal A or A' corresponds to that received by loop 10 and impressed upon loop radio frequency amplifier, and modulated at 32 by the tone signal generated at 31.

Curves B and B' represent the tone modulating signal impressed by balanced oscillator 31 upon the grid electrodes of the balanced modulator 32. Curves B and B' are 180 degrees out of phase, corresponding to the opposed polarity of the balanced output of oscillator 31. Curve B may be assumed to correspond to the phase of the signal impressed upon the grid of modulator tube 86, and curve B' that impressed upon the grid of the modulator tube 86'. For diagrammatic reasons, the tone cycle is represented as including only five cycles of the radio frequency signals indicated at A. However, the frequency of curves B and B' is the 102.5 cycles as already described, and radio signals A and A' of the order of kilocycles. The tone signal corresponding to curves B and B' is impressed upon the grid electrodes of balanced modulator stage 86, 86' through coupling resistors 105, 106 and coupling condensers 107, 107', simultaneously with the impression of a received loop radio signal corresponding to curve A or A' through coupling condensers 87, 87'.

Grid circuit modulation is effected in balanced modulator 32, cancelling out the carrier wave in its output connected across coupling coil 33. The side bands follow through, corresponding to the addition and subtraction of the tone frequency with the radio carrier frequency. Curve C corresponds to the tone modulated loop signal as passed for example by modulator tube 86 when the positive half cycle a of the B curve is effective thereon. Square-law modulation is effectively employed and the resultant signal indicated by curve C is proportional to the instantaneous value of tone signal B and the loop signal A. Upon the second half or negative cycle b of tone curve B, upper modulator stage 86 will be choked or negatively biased and not pass any signal. During this half cycle, the current flow from tube 86 will be zero as indicated on curve C. The frequency of curve C corresponds to the radio frequency side bands due to the modulation by the tone signal, and the envelope thereof corresponds to the shape and frequency of the modulating tone current. Dotted curve C' represents the modulated resultant at the first half of the modulation stage, but corresponds to the dotted reception position 10' of the loop antenna and is identical with curve C except for a 180 degree phase displacement with respect thereto.

Curves D and D' represent the signal flow through the lower or second modulator stage 86'. Dashed tone curve B' represents the tone modulating signal impressed upon the grid of modulator tube 86', 180 degrees out of phase with that impressed upon upper stage 86. The first half of the cycle a', negatively biases stage 86' resulting in a zero signal output therefrom. During the second half, b', of the cycle, the biasing is positive and proportional to the instantaneous magnitude of curve B', resulting in solid curve D corresponding to curve C for loop position 10, and the oppositely phased dotted curve D' when the loop is at dotted position 10'. The output of modulator 32 is balanced and connected to opposite sides of coupling coil 33. Secondary winding 24 of radio frequency amplifier 80 is accordingly continually impressed with tone modulated signals corresponding to curves C and D, or C' and D', since tubes 86 and 86' are alternately rendered conductive.

Radio signals from non-directional antenna 20 are also impressed upon secondary winding 24. Directional arrows 300' in Fig. 3 indicate the same radio waves impressed upon non-directional antenna 20 as are impressed upon loop antenna 10. Curve E represents non-directionally received radio wave signals by antenna 20 connected to primary winding 21 and impressed upon secondary winding 24 for amplifier stage 80. The radio signal is the same as that received by the loop and has the same wave form. Non-directional signal E is used as a reference, and when combined with the modulated loop signals imparts a "sense" to the resultant control signal and eliminates directional ambiguity for the system. Choke coil 85 serves as a 90 degree phase shifter for the loop radio signals to compensate for the 90 degree difference between the resultant loop signal voltage and antenna 20 voltage. In practice choke coil 85 serves as a capacitance due to distributed capacity thereof.

The phase of non-directional signal E is accordingly the reference phase for the radio waves and made to correspond to one of the loop signals, such as curve A, and 180 degrees opposite to curve A'. The relative magnitude of non-directional signal E and the loop radio signals is optional. A suitable ratio of the magnitudes is such that when loop antenna 10 is in its position for maximum signal reception, namely when $\theta$ is 90 degrees, the signal impressed upon secondary winding 24, with the carrier suppressed, is of the same order of or equal to the signal impressed therein by non-directional antenna winding 21. However, different ratios are feasible, the essential factor being the relative phase relations of the signals which are substantially in the same phase or 180 degrees out of phase at secondary winding 24, in accordance with the off-null direction of loop antenna 10.

The superposition of the modulated loop signals impressed by winding 33 and the non-directional radio signals by winding 21 upon secondary winding 24 causes simultaneous actuation of grid electrode 110 of radio frequency amplifier 80. When the loop antenna is in position $\theta_R$, inducing loop radio signal A at amplifier 82 and resultant signals C and D at modulator stage 32, a resultant signal occurs at output transformer 111 of stage 80 corresponding to the curve shown at F. The envelope $m, m'$ of curve F conforms to the tone modulating signal. In the first half of the illustrated wave form, the radio frequency wave E is added to or increased due to the in-phase relation of curve C therewith. In the second half of curve F, the amplitude thereof is decreased due to the opposite phase relation of the signal due to curve D.

When the loop antenna is at position 10' forming angle $\theta_L$ with respect to its null position, the resultant signal at output transformer 111 of radio frequency amplifier stage 80 is represented by dotted curve G. Curve G is similar to curve F except that envelope $n, n'$ is 180 degrees out-of-phase with respect to envelope $m, m'$ of curve F. This is due to the respective 180 degree phase displacement of loop modulator signals C' and D' with respect to signals C and D, as will now be evident to those skilled in the art.

The resultant radio frequency signals corresponding to curves F and G are further amplified through the superheterodyne circuit including intermediate frequency stages 135, and audio frequency detector stage 140. The audio frequency components of the amplified radio waves includes the regular signal modulations of the radio carrier at the radio station, such as weather reports, bulletins, or sound broadcast, together with the tone frequency component of the wave corresponding to the envelope of curves F or G. As already described, the audio frequency signal components are further amplified by audio frequency amplifier stages 150, 155, 160. The broadcast modulations together with any tone frequency component are introduced to aural amplifier 170 for energizing head-phones 175 for the pilot.

When loop antenna 10 is in an off-null position with respect to the transmitter of the radio signals, a tone frequency or control signal component is heard in head-phones 175. The pilot is accordingly continuously apprised of off-course flight. The introduction of the tone or control signal into the head-phones serves as an excellent warning to the pilot when he is off-course so that he may properly perform his flight duties with respect to the direction of the radio station. The output of audio frequency amplifier 160 is introduced to phasing network 162, 163 and another audio frequency amplifier stage 180. A pass filter for the tone frequency, namely 102.5 cycles, substantially rejects other audio frequencies and efficiently passes the tone or control signal for further amplification by stage 190 whereupon it is introduced to audio frequency transformer 195 connecting to control system 45.

*Electronic relay control tube system*

Figs. 4, 5 and 6 are schematic diagrams of preferred forms which the electronic control tube system, generally indicated at 45, may assume in practice. Fig. 4 is a schematic electrical diagram of one arrangement for relay control system 45, shown together with the associated tone oscillator and control signal amplifier. Audio frequency amplifier stage 190 is at the right. The output signal of amplifier stage 190 is predominantly the tone frequency resulting from the demodulation of the tone modulated wave corresponding to curves F or G of Fig. 3. Curves M and N of Fig. 4a illustrate the wave form of the tone signal impressed upon secondary winding 196 of transformer 195. Curve M corresponds to envelope $m, m'$ of curve F; and curve N, to envelope $n, n'$ of curve G. Curves M and N are above the horizontal zero axis corresponding to a substantial initial biasing voltage indicated by broken line R. A condenser 310 is shunted across secondary winding 196 arranged for more efficiently passing the selected tone frequency of 102.5 cycles to the tube control system 45.

The substantial positive initial biasing voltage on secondary winding 196 makes the operation of tube relay control system 45 more sensitive to the control signal. The biasing voltage is supplied from constant B voltage potential point 315 through lead 316 and resistor network 311, 312, and 313. The voltage at point 315 is held constant to keep the sensitivity and performance of the circuit uniform. The B voltage supply to point 315 is obtained from terminal 320 connected to the common B voltage of the system, through series resistor 97. A voltage regulator device 200 is shunted across the uni-potential point 315 and ground to hold the operating potential at point 315 constant over wide variations in the B potential supply to terminal 320.

A suitable voltage regulator for the direction indicator circuit is a cold-cathode, glow-discharge tube. In the practical embodiment thereof I employ a voltage regulator tube 200 rated to maintain a voltage of 150 volts at point 315. Variation in the voltage supply to point 320 causes a variable drop across series resistor 97, which is 2000 ohms in the chosen circuit. The current flow through regulator tube 200 varies in the well-known manner to maintain the rated voltage, of 150 volts, at point 315. It is to be understood that other voltage regulator devices than tube 200, and a different voltage value or circuit connections to maintain the constant voltage potential at point 315 may be used.

The constant potential source at point 315 is an important feature of the present invention and is used to supply the anode potentials to the 102.5 cycle oscillator 31, amplifier 43, as well as the direct current biasing voltage at secondary winding 196 for relay control system 45. Uniform, reliable and foolproof functioning of the tube relay control system 45 depends upon substantial constant biasing potentials and relative magnitudes of the respective control signals. The selective operation of the relay system depends upon the 180 degree relative phase displacements of the control signal as hereinabove described. For best practical operation, the phase relations and relative voltage magnitudes should be near the predetermined values for proper automatic operation of the system. Should the voltage rise, the control tubes of system 45 would fire and defeat any selective or automatic operation thereof. Should the voltage fall too low, the sensitivity of action of the control tubes would be impaired. Constant voltage supply for oscillator 31 insures proper tone signal generation as to amplitude and frequency, and maintains the overall sensitivity of the directional system.

The tube relay control system 45 illustrated in Fig. 4 comprises two associated electronic control tubes T and T'. Electronic tubes T and T' may be high-vacuum triodes, mercury vapor relay tubes or Thyratrons, or cold-cathode glow-discharge tubes with a starter-anode. The latter type is schematically indicated in the figure, containing starter-anodes 330, 330', cathodes 331, 331' and anodes 332, and 332'. The tube, currently known as type OA4-G, has been found suitable in practice for this purpose. The OA4-G tubes are designed so that a starter anode voltage of 110 volts at electrodes 330, 330' will fire or break-down the tube affected and establish a current flow between the anode and cathode thereof. Anodes 332, 332' of relay tubes T and T' are energized by an alternating current signal at the tone frequency derived from the oscillator 31 and amplifier 43 connected in a push-pull relationship, i. e., 180 degree phase displacement relation.

The output of oscillator 31 is coupled to push-pull amplifier stage 43 by coupling condensers 335. Amplifier tubes 336, 336' of stage 43 are preferably of the high efficient type known as electron beam power tubes. A battery biasing arrangement, using 339, the ship's battery, aids in stabilizing the action of amplifier stage 43. Curves P and P' of Fig. 4a represent the relative phase and wave form of the tone frequency signal input to anodes 332, 332' of respective control tubes T and T'. The output of amplifier tubes 336 and 336' is coupled to center-tapped primary winding 337 of step-down transformer 338. Secondary winding 340 of transformer 338 is center-tapped to ground, the outer terminals thereof being connected to control tube anodes 332, 332' through relay solenoids S and S' respectively. Signal curve P may be said to represent the voltage input to anode 332 of upper tube T; curve P', displaced 180 degrees with respect to curve P by the balanced connection, to anode 332' of tube T'.

The control signal impressed across starter anodes 330, 330' is in phase for both starter anodes, and is adjusted through variable tap 350 of potentiometer 314 connected across secondary 196 of transformer 195. As already described, the direct current biasing voltage supplied by bleeder or resistance network 312, 313, 314 is of the order of 85 volts with respect to ground as represented by lines R in Fig. 4a in the control signal input curves M and N. Series resistors 341, 341' are connected between tap 350 and starter anodes 330, 330'. The magnitude of the resultant signal impressed upon starter anodes 330, 330' is adjustable by the variable tap 350 of potentiometer 314, to establish a predetermined sensitivity for the system. When a control signal resulting from the position of loop antenna 10 at $\theta_R$ as shown in Fig. 3 is impressed upon secondary winding 196, both starter anodes 330 and 330' are similarly energized by the biased signal of curve M. When the loop is in the opposite position, corresponding to angle $\theta_L$, the dotted curve N is effective in controlling the voltage on starter anodes 330 and 330'.

An alternating tone frequency voltage is continually impressed upon anodes 332, 332' by transformer 338 of the order of 140 to 150 peak volts for each anode with respect to ground. The voltage across the terminals of secondary winding 340 of transformer 338 is accordingly 280 to 300 volts peak value. Transformer 338 is preferably a step-down transformer limiting the peak value of the voltage impressed upon the anodes of control tubes T and T', and giving good current regulation for the transformer 338 despite the drawing of current by the anode circuit of the tubes upon firing. The peak voltage of the tone signal applied to anodes 332, 332' is not above 150 volts per tube for the preferred arrangement, in order to avoid breakdown or firing of the tubes, until a control signal of proper magnitude is applied to their starter-anodes 330, 330'. A step-down transformer of 2:1 ratio is satisfactory, giving a peak instantaneous signal voltage across the outside terminals of primary winding 337 of the order of 600 volts. Curves P and P' of Fig. 4a show equal magnitude but 180° phase displacement of anode tone signals impressed upon anodes 332 and 332' respectively.

The initial positive bias upon starter anodes 330, 330' is of the order of 85 volts with respect to ground in the preferred arrangement employing OA4-G tubes. Cathodes 331, 331' are normally maintained at a positive 12 volt potential with respect to ground through respective cathode resistors 375, 375' connected to battery 55 through relay armatures 58 and 53 respectively. The relative potential of starter anodes 330, 330' with respect to anodes 332, 332' is 85 volts minus 12 volts, or 73 volts. When superimposed control-signal M or N, is of the order of 30 volts peak value, one of the control tubes T or T' will in this event break-down or fire, since the peak positive value then imparted to starter anodes 330, 331' will be about 115 volts with respect to ground, or about 103 volts with respect to anodes 332, 332'. However, the phase relation of signal M or N with respect to anode signals P or P' determines which of tubes T or T' will fire.

In a practical embodiment of my present invention, a loop displacement of about 1° from null signal position produces an alternating control signal component for M or N of about 10 to 15 volt peak value. A displacement of the loop slightly more than 1° will bring it to a 30 or 40 volt peak value. A displacement of between 2 and 3 degrees will bring the control signal component to its highest value of 50 to 60 volt peak. Above 60 volts saturation of the control signal amplifier tubes may occur in practice, passing the signal but flattening its wave shape to maintain the signal at the 60 volt peak. Accordingly, a sufficient control signal is effective for operating the motor relays S and S' when the loop is as much as 1° off-null. A novel connection of cathode resistors 375, 375' with respect to relay armatures 53 and 58 insures an even closer tolerance than the 1° accuracy as will be hereinafter described, as well as minimizes possible hunting by the motor.

When the loop antenna is displaced to position 10, corresponding to angle $\theta_R$ in Fig. 3, resultant signal M shown in Fig. 4a is impressed upon starter-anodes 330, 330' of control tubes T and T'. Anodes 332, 332' of the control tubes are continuously energized by oppositely phased tone signals represented by curves P and P'. For loop position $\theta_R$ tube T will fire at alternate half cycles, corresponding to the periods when anode 332 and starter-anode 330 are at their positive half cycle values. Tube T will accordingly break down or fire during half cycle periods $a$ and $c$ shown by firing current curve $i_{p_1}$ thereof. It is to be noted that voltage curve P' applied to anode 332' of tube T', is 180° out-of-phase, and negative when starter-anode voltage curve M is positive so that tube T' does not fire. Conversely, when the loop antenna is at position 10' as shown in Fig. 3, producing resultant control signal shown in dotted at N for starter-anodes 330, 330', only tube T' will fire since the positive half cycles corresponding only to curves P' and N will coincide to initiate the firing action. Current curve $i_{p_2}$ shows the firing of tube T' at the b' and d' half cycle periods, tube T being non-conductive during that time.

It will now accordingly be evident that selective firing of tubes T and T' takes place dependent upon the relative off-null position of the loop antenna. One of the tubes, such as tube T, is arranged to fire when the loop antenna is deflected in the $θ_R$ direction; and the other tube T', when the loop is deflected in the opposite or $θ_L$ direction. Condensers C and C' are respectively shunted across relay solenoids S and S' for smoothing out pulsating current flow resulting from the interrupted firing action of tubes T and T'. A condenser of the order of one and one-half microfarads is satisfactory for flattening out the current of solenoids S and S', producing corresponding currents $i_s$ and $i_{s_1}$ as shown in Fig. 4a. The average value of the solenoid current is about 40 to 50 per cent of the peak value of the control tube currents.

It is to be understood that only one or the other of solenoids S or S' is energized at a given time dependent upon the direction of the displacement of loop antenna 10 from its null. Accordingly, when either tube is fired, an anode current will flow through the respective relay solenoids S or S' of sufficient magnitude to energize it to attract its respective armatures 53 or 58. Solenoids S and S' may each have a 2000 ohm impedance. An average direct current of 12 milliamperes flows through either solenoid when using the chosen parameters.

The particular connections shown for the gaseous control tubes, such as those for the anode signals and control voltage signals impressed thereon may assume different forms. For example, the anodes may be connected in parallel or in-phase, and the starter-anodes controlled in push-pull or opposite-phase relation. Furthermore, as previously stated high vacuum triodes may be employed in place of the gaseous tubes. However, the abrupt and large current changes feasible with gaseous control tubes permits the use of less sensitive relays for S and S' for satisfactory service. The use of the gaseous control tubes T and T' results in a rugged relay system affording foolproof service in practice for the automatic remote motor operation of the loop antenna.

Relay armatures 53 and 58 are connected directly to the rotor or armature 370 of loop motor 30 through respective connection leads 361 and 361'. The relay armatures are normally against their respective back contacts 362 and 362' which are in turn connected to the positive terminal of direct current source 55, the negative terminal of which is grounded. Front contacts 54 and 59 of the relays connect to respective armatures 53 and 58 when corresponding solenoid S or S' is energized.

When solenoid S is energized due to the firing of tube T, relay armature 53 is attracted to its front contact 54 and current will flow to armature 370 of motor 30 as follows: relay armature 53, connection lead 361, rotor 370, connection lead 361', relay armature 58, back contact 362', battery 55, and to ground back through front contact 54 and relay armature 53. The stator of motor 30 is preferably formed of a permanent magnet 371 to conserve battery energy for operating the motor. The small power required to drive the loop antenna permits the use of an efficient permanent magnet type motor of relatively low current drain. The usual 12 volt battery of an aircraft is sufficient to properly drive the reversible motor when either relay S or S' is energized.

When relay armature 53 is attracted by solenoid S upon firing of tube T, motor 30 is arranged to rotate in a direction to turn the loop through gearing connection 56 in the direction to decrease angle $θ$ and bring it to the null signal position. In the example described above, relay S is energized when loop 10 forms an angle $θ_R$, with respect to its null position as shown in Fig. 3. Motor 30 will then be energized to turn the loop counter-clockwise to the null position. As the loop approaches the null signal position, the magnitude of control signal M correspondingly decreases. When the loop is practically at the null position, within 1°, the magnitude of control signal M will fall below the value necessary to cause tube T to fire, and relay S and motor 30 become deenergized. The loop is thus brought to null and stopped in that position to within 1° of the direction to the radio station.

Conversely, when the orientation of the loop antenna forms an angle to the left, or $θ_L$, with respect to the direction of the radio waves 300 shown in Fig. 3, control signal N is produced which causes the firing of tube T' and not T. In this case solenoid S' is energized, attracting its armature 58 to front contact 59. Armature 53 remains in the neutral back contact position and motor 30 is energized by the direct current source in a reverse direction to that previously described. Thus, the loop will be rotated in the clockwise direction with the motor oppositely energized, decreasing the magnitude of angle $θ_L$ and bringing the loop to practically the null signal position, such as within 1° of arc, whereupon tube T' ceases firing, and solenoid S' and motor 30 are deenergized.

By the loop null signal position is meant the position of the loop wherein its received radio signal is a minimum or zero. The system of my invention may be readily constructed to automatically move the loop antenna to within 1° of this null signal position, and the control signal component of curves M or N derived from a small residual loop signal by modulation and large amplification may be of the order of 15 volts or less. The bearing sensitivity of the system may be theoretically increased, but a ±1° bearing accuracy is satisfactory in practice. Increasing bias voltage R on starter-anodes 330, 330' increases the sensitivity of loop control. The stability of operation with the disclosed parameters however, has been found most satisfactory for commercial aircraft service.

The loop drive arrangement is effective at its full speed and torque in bringing the loop antenna from any off-null position to null. Circuit arrangements are provided to substantially increase the sensitivity of firing or initiating the motor control circuit into the opposite direction should the motor overdrive or overshoot the null position. The novel reverse biasing arrangement for tubes T and T' during loop motivation will be described hereinafter.

The rate of loop rotation to the null signal position for the bearing may be designed to be 180° per second or greater and depends upon the motor speed and gearing ratio. I have found a rotation rate of the order of 25° per second most satisfactory for commercial operation. It is however to be understood that a substantially greater or smaller rate of automatic loop rotation for the bearing determinations may be used. The loop is rotated to the bearing position through the shorter path. When the automatic indicator system of the invention is used in an instrument approach or instrument landing system such as described in my co-pending application Serial Number 291,807, filed on August 25, 1939, a much greater rate of loop rotation is indicated.

*Anti-hunting motor control system*

The automatic loop antenna control system of my invention is instantly effective at the full normal speed, torque and energization for motivating the loop antenna to the bearing position should it pass beyond the null bearing position, within 1° in the present case. Prior attempts at utilizing rated speed motivation of the loop antenna near null resulted in its overshooting or hunting and unstable operation. The present invention overcomes such serious practical disadvantage, and provides anti-hunting means to accomplish stable bearing motivation of the loop antenna. The operation of the present invention does not decrease the speed or sensitivity of the loop bearing control near the null position, but rather increases the sensitivity of the control circuits for bringing and maintaining the loop antenna at the null position within the desired tolerance, which may be within 1° in the practical embodiment. For maintaining the sensitivity and speed of the loop drive near the null position, I provide practical means for preventing hunting, overshooting or overdriving of the loop motivation means, stabilizing the action of the automatic direction indicator with bearings which do not wobble or have extraneous movements.

The electro-magnetic clutch, shown at 57 in Fig. 1, is an important element for stabilizing the loop antenna drive. When motor 30 is energized by battery 55, clutch 57 also is energized immediately coupling the motor shaft to reduction gearing 56 of the loop antenna. Fig. 10 shows electro-magnetic clutch 57 in partial section. The particular form of clutch 57 is immaterial, and any suitable one known in the art may be employed. Armature 370 of motor 30 drives motor shaft 380 mechanically connected with section 381 of clutch 57. Section 382 of clutch 57 is slidably connected to shaft 383 on which is secured pinion 384 of beveled gearing 56. Pinion 384 meshes with gear 385 of loop shaft 11.

Slip rings 386, electrically connected to the terminals of electro-magnetic winding 387 within section 381 of clutch 57, coact with brushes 388 electrically connected across the motor energization circuit. When motor 30 is energized, winding 387 of clutch 57 is accordingly also energized, attracting section 382 of clutch 57 to cause frictional engagement of annular ring 390 and plate 391. Annular ring 390 may be of leather, rubber, or similar material. Ring 390 coacts with metallic disk or plate 391 made of steel or other material. Clutch 57 of Fig. 10 is indicated diagrammatically, its actual construction for performing the functions described being well understood by those skilled in the art.

When motor 30 is energized for rotation in either direction, it is immediately engaged with the loop antenna by clutch 57. As soon as motor 30 is deenergized, clutch 57 disconnects motor shaft 380 from gearing 56. Thus, overdriving of motor 30 due to inertia of its rotor 370 is not transmitted to the loop antenna. Ordinary frictional resistance in the loop bearings and gearings 56 is sufficient to stop the loop upon deenergization of motor 30 and disconnection of clutch 57. By arranging reduction gearing 56 to step-down the speed in a ratio as low as 120:1, possible slight over-driving by the motor during the short interval of clutch disconnection results in a negligible angular rotation effect on loop 10.

Other means for abruptly stopping the driving of the loop upon motor deenergization may be employed. Electromagnetic braking of the motor is for example feasible by arranging to short circuit the motor upon its deenergization. A further feasible arrangement includes an electromagnetic brake for the loop, inserting a substantial frictional resistance on loop shaft 11 upon deenergization of the motor 30, which action is removed upon electrical reenergization of motor 30 and clutch 57.

Another important feature of the present invention is the anti-hunting circuit provided for the electronic motor control tube system as shown at 45 in Fig. 4. Cathode resistors 375, 375' are connected to the positive terminal of battery 55 through relay armatures 58 and 53 respectively which are in turn connected to motor armature 370 through leads 361' and 361. When neither solenoid S or S' is energized, armatures 53 and 58 are against their back contacts 362, 362' normally biasing cathodes 331, 331' to the positive 12 volt (or other desired voltage) value. The 12 volt value is chosen since it is the usual aircraft battery supply voltage.

The action of the positive 12 volt potential on cathodes 331, 331' is to reduce the effect of the biasing of starter anodes 330, 330' by a corresponding amount. Thus the starter anode biasing of the order of 85 volts, is reduced to an effective 73 volts. When either tube T or T' is fired due to a suitable control signal impressed upon starter anodes 330, 330', corresponding armature 53 or 58 is attracted to the front contact position 54 or 59 respectively to energize motor 30 in the proper direction. The direction of rotation of the motor, as already explained, is arranged to bring the loop antenna to the null signal position by the shorter angular route.

When tube T is energized, relay armature 53 is attracted to the front contact 54 and away from back contact 362. At this instant, the positive 12 volt bias on cathode 331' of tube T' is removed. The removal of the 12 volt positive bias from cathode 331' increases the sensitivity of starter anode 330' with respect to anode 332' by an equal amount. The effect of bias removal from cathode 331' is to enhance the sensitivity of control tube T'. The bias increase by such action should be below that directly causing firing of the tube. Unenergized tube T' is made more sensitive to a control signal of phase opposite to that firing tube T, and be more readily responsive to control motor 30 to the opposite direction of rotation should the loop antenna be moved beyond the null position by the firing of tube T.

The unfired tube is thus rendered more sensitive to a control signal from the opposite direction to that causing the firing. Any tendency of the loop to overshoot the null signal position is more readily counteracted by a lower than normal control signal value, due to the increased sensitivity of the unfired side. Conversely, when tube T' is energized, attracting relay armature 58 to rotate the motor in the opposite direction, cathode 331 of tube T is connected to ground, increasing its firing sensitivity. A control of the motor drive is thus provided to prevent hunting or overshooting within rather close limits, well within the 1° in the practical embodiment.

Another effective method for stopping hunting or overshooting of the loop motor drive is illustrated in connection with Figs. 5 and 6. Starter anodes 330, 330' of control tubes T and T' are impressed with the control signal M or N through series resistors 341, 341' similar to the circuit of Fig. 4. Relay solenoids S and S', shunted with condensers C and C' respectively, are connected in circuit with anode 332, 332' of tubes T and T'. The anode tone signal frequency is impressed by transformer 338 through leads 345, 346 and 345', 346' respectively, through normally closed relays 347 and 347'. The cathode biasing connections and motor relay connections are similar to those shown in Fig. 4. Fig. 5 however additionally contains the anode relays 347, 347' in series with the anode circuits of tubes T and T'.

Relay contacts 347, 347' are constructed to have a mechanical vibration frequency different from that of the tone frequency. A lower vibration frequency is preferable for relay contact 347, 347' such as of the order of 5 to 10 or 20 cycles, per second. When either of relay tubes T or T' is energized, the corresponding relay contact 347 or 347' is opened due to the energization of solenoids S or S'. In Fig. 5, tube T and solenoid S are energized, attracting armature 53 to complete the motor energization, and attracting the armature of relay switch 347 to open it. When the contacts of relay 347 are opened, the tone signal applied to anode 332 of tube T through leads 345 and 346 is interrupted and tube T ceases firing. When tube T ceases firing, solenoid S is deenergized and armature 347 returns to the normal closed contact position. The stiffness and dimensions of the armature of relay 347 is proportioned to give the desired mechanical frequency differing from the tone frequency in the preferred case.

A frequency of 10 cycles per second may well be used when a 102.5 cycle tone frequency is employed. A higher or smaller mechanical frequency for relays 347 and 347' is, however, feasible. Tube T continues firing while the contacts of relay 347 are engaged, and ceases firing when the contacts open, even though the control signal on starter anode 330 is of sufficient magnitude to cause firing. Thus, instead of firing 102.5 alternate half-cycles per second, tube T will fire for about 5 alternate half-cycles, cease firing for the next 5 alternate half-cycle periods when it otherwise would have fired, again fire for 5 alternate half-cycles, etc., due to the 10 cycle per second alternation of mechanical relay 347. Solenoid S remains continuously energized while the contacts of relay 347 are closed due to the action of condenser C. Energy will accordingly be intermittently fed to motor 30 at a rate, corresponding to the mechanical frequency of relay 347.

Motor 30 operates satisfactorily with the intermittent energization, and drives the loop at a suitable angular speed for the bearing indications. The intermittent energization of the motor by the random frequency effect afforded by the mechanical relay permits a more rigid control of the starting and stopping of the motor when the loop is near the null signal position. Due to the regular intermittent energization of the motor relay, the average speed of the motor is kept constant. The starting and stopping action thereof is thus made more controllable as compared to continuous energization of the motor, and the tendency to hunting and overshooting is greatly reduced.

Conversely, when tube T' instead of tube T is fired, its associated mechanical relay 347' is energized and vibrated at its predetermined mechanical frequency to intermittently start and stop the firing of tube T'. The intermittent energization of motor 30 occurs in the opposite direction of rotation. The mechanical frequency of interruption of relay 347 or 347' is preferably not an exact sub-multiple of the tone frequency energizing tubes T and T', if satisfactory use is made the factor of random intermittent frequency of motor interruption. Mechanically vibrating relays 347, 347' are preferably designed to be in engaging contact for about half its vibration cycle, and open for the other half.

Other modes of motor drive interruption are feasible. Another form is illustrated in Fig. 6, wherein the battery supply to the motor is interrupted at the frequency corresponding to the mechanical frequency of relays 347, 347'. Tubes T and T', and associated relays S and S' are connected to the energization signals in a manner similar to that shown in Fig. 4. Motor 30' is shown as a direct current motor having a stator or field winding 372 energized by a local direct current source 55a in place of the permanent magnet 371 of Fig. 4. A switch 373 is used to open the motor field circuit during non-operation periods of the system.

A mechanical vibrator 400 is connected between the motor armature, battery 55, and the relay contacts to interrupt the supply of current to the motor armature at a given frequency and intermittently energize motor 30' for loop rotation. Solenoids 401 of vibrator 400 are connected in series between the positive terminal of battery 55 and ground. Vibratory armature 402 coacts with solenoids 401 and fixed contact member 403 through flexible contact element 404. When contact member 404 engages contact member 403, the positive side of battery 55 is connected to the motor relays in the usual manner. When contact between points 403 and 404 is broken, the current supply to the motor is interrupted.

In Fig. 6 tube T is shown being fired, energizing solenoid S which attracts armature 53. The vibration frequency of armature 402 is designed to operate at a low frequency, such as 10 cycles per second, interrupting current to motor armature 370 at that frequency. A condenser 405 is shunted across contacts 403—404 to minimize sparking effects. The current carrying capacity of the contacts of vibrator 400 is made substantial to properly carry the motor current. It is to be understood that a lower or higher vibration frequency of relay 400 is equally effective in performing the anti-hunting and motor stabilization action. The position in the circuit of vibrator 400 is optional.

*Loop antenna drive arrangements*

Manual control of the loop antenna is useful when radio reception by the loop during precipitation static conditions, or manual direction finding is indicated. Figs. 7, 8 and 9 show preferred arrangements for enabling remote manual control of the loop antenna as well as automatic motor control thereof when desired. Figs. 10 and 11 show alternate motor drive arrangements for the loop antenna.

In Fig. 7 loop antenna 10, mounted upon rotatable shaft 11, is connected to the loop transmission cable 14 through slip rings in the manner already described. A worm and worm gear drive 410, 411 for the loop is connected to motor 30 through a spur gear and pinion arrangement 412, 413 and electromagnetic clutch 57. Motor 30 and clutch 57 are connected to the motor relays in the manner already described. Rotation of loop 10 through the motor, clutch and indicated gearing occurs in the manner similar to that previously described. A further rotational control for loop 10 is provided through mechanical cable 415 connected to hand-crank 416 through clutch release member 417. Flexible mechanical cable 415 is made sufficiently long to reach the cockpit.

Gears 410, 411 have a reduction ratio smaller than corresponding gears 56 previously described, to render manual rotation through crank 416 more effective. Thus, a reduction ratio of 40:1 is sufficient for this position. A second reduction is applied between gears 410, 411 and motor 30 through spur gearing 412, 413 which in the practical embodiment may have a 10:1 ratio. Clutch 417 normally biases crank 416 out of engagement so that it will not turn when the loop is rotated by motor 30. The pilot engages clutch 317 when he desires to manually rotate the loop antenna.

A mechanical loop position indicator 420 is driven by a worm gear 422 secured to mechanical shaft 415. A negligible angular lag by shaft 415 provides accurate bearing indications through indicator needle 421. A quadrantal corrector unit 425 is inserted in loop shaft 11 between gear 410 and loop 10. Quadrantal unit indicated at 425 is a mechanical arrangement for varying or otherwise compensating for the angular position of loop 10 with respect to drive gear 410 in accordance with determined electrical bearing distortions caused by metallic structural components of the aircraft. Thus, any position indicated by needle 421 will be the correct or compensated bearing corresponding to an electrical null position of loop 10. A quadrantal error corrector may similarly be inserted between loop 10 and loop position transmitter 60 as shown in the system of Fig. 1 should such bearing corrections be indicated. Quadrantal error corrector 425 is indicated in schematic form and a suitable preferred construction thereof is described in my copending application Serial Number 344,854, filed on July 11, 1940.

Fig. 8 shows a further form for the combined manual and automatic loop drive. In this example, motor drive 30 and associated electromagnetic clutch 57 is positioned near the hand-crank in the cockpit remote from loop antenna 10 as indicated by broken lines 426. Reduction spur gearing 412′, 413 connects the clutch side of the motor drive to mechanical shaft 415 through reversible-drive gearing arrangement 430. Bevel gear 432, is slidably keyed on shaft 434 connected with gear 412′ for engagement with bevel gear 433 secured to the end of flexible cable 415. Opposed bevel gear 431 is secured to crank shaft 437 and is mechanically separate from bevel gear 432.

Spring 435 normally mechanically biases bevel gear 432 into engagement with gear 433 so that motor 30 will be normally effective in rotating loop 10. Should the pilot desire to manually rotate loop 10, he simply grips the crank handle 436, presses it inwardly against biasing spring 435 to disengage the motor drive from gear 433 and engage bevel gear 431 therewith. Direct manual driving control of loop 10 is effected in this manner, independently of any energization of motor 30. In this example, gears 412′, 413 are not driven, and free manual rotation of loop 10 is possible without hindrance from the motor or its gearing thereof. Manual rotation of loop antenna 10 in the embodiments shown in Figs. 7 and 8 does not entail rotation of motor 30. Furthermore, when loop antenna 10 is driven by motor 30, the crank handle is mechanically disconnected and is not rotated.

An indicator 440 is mechanically connected to shaft 415 through worm 441 on shaft 415. Worm gear 442 meshes with worm 441. Indicator 440 is coupled to gear 442 through shaft 443. A quadrantal or azimuth compensator is incorporated in indicator 440 so that bearing indicated by needle 445 thereof is corrected for quadrantal errors.

Still another form for the combined manual and motor drive arrangement for rotatable antenna 10 is illustrated in Fig. 9. Motor 30 is associated with a multiple gearing system 450 connected to loop shaft 11. The train of gears comprising system 450 includes spur gear 451 secured to loop shaft 11 and associated pinion 452 meshing therewith in turn secured to spur gear 453 meshing with pinion 454. Pinion 454 is connected to the end of flexible shaft 455 extending to dashboard 456 of the cockpit. A further spur gear 457 is rotated with pinion 454 coupled to pinion 458 through intermediate gearing 459, 460. The clutch side of the motor drive is coupled to pinion 458 through beveled gears 461, 462. The overall ratio of gear train 450 between pinion 458 and loop gear 451 is of the order of 120:1 in a preferred arrangement for substantially increasing the motor speed for rotation of loop antenna 10.

The manual drive connection through crank 465 at dashboard 456 with gear train 450 through flexible shaft 455 is effected at an intermediate section of the gear train through a normally disengaged clutch 466. Thus, the manual turning effort by crank 465 upon loop 10 is at a lower reduction ratio than the motor 30 turning effort. Clutch 466 is schematically shown containing spring 467 biasing crank 465 out of engagement with clutch 466. When the pilot wishes to manually rotate loop 10, he presses crank 465 inwardly against spring 467 engaging clutch 466 and driving the loop through the intermediate gearing. Motor 30 and clutch 57 are not energized during the manual control, and the armature of motor 30 does not add to the mechanical load of the rotating system.

A mechanical quadrantal error corrector 470 is inserted in shaft 11 between loop 10 and electric position repeater 475. Electric position repeater 475 and associated loop azimuth indicator 476 correspond to the telemetering arrangement 60, 64 shown in Figs. 1 and 10. A battery 477 energizes the position repeater units interconnected by cable 478. Indications by needle 480 of indicator 476 correspond to the azimuthal bearings due to the quadrantal error corrections by unit 470. Broken lines 481 schematically indicate a remote position before dashboard 456, carrying crank 465, and loop position indicator 476.

Fig. 10 diagrammatically illustrates a straight motor-clutch arrangement for loop antenna shaft 11 energized through leads 361, 361', from motor relays controlled by electronic tube system 45 already described. A condenser 373 may be used, as shown, connected across the motor armature for minimizing sparking thereof and reducing possible radio interference with the sensitive radio system. However, I have found that a shielded compartment for the motor system indicated at 28 in Fig. 1 is sufficient to eliminate intereference in practice without condenser 373.

The telemetering arrangement 60, 64 diagrammatically illustrated in Fig. 10 is a direct current Selsyn type system. Brushes 485, 486 are mechanically tied with loop shaft 11 and coact with a bared section of a 360° potentiometer winding 487. Brushes 485, 486 are connected to direct current battery 61. Remote position indicator 64 comprises toroidal winding 488 and rotatable magnetic core 490 electromagnetically related therewith. Needle 65 of the indicator is tied to magnetic coil 490 as shown. Annular potentiometer 487 and toroidal winding 488 are interconnected at three equi-spaced taps through leads 491, 492, 493. When loop shaft 11 changes its position, brushes 485, 486 are carried therewith to change the relative direct current energization of and the respective current distribution through the three sections of winding 487 and correspondingly through toroidal winding 488.

The current distribution change through the windings correspondingly alters the effective magnetic flux orientation of winding 488 with respect to magnetic core 490. Magnetic core 490 accordingly orientates itself to the most stable magnetic position in indicator 64 which corresponds to the position of brushes 485, 486 on transmitter 60, and gives an accurate indication of the position of loop antenna 10. Should a quadrantal error compensator be inserted between loop 10 and position transmitter 60 as shown in Fig. 9, the indications by needle 65 will change to correspond to the quadrantal error corrections as will now be evident. It is to be understood that different telemetering arrangements may be used for the loop antenna including alternating current Selsyn indicators, remote mechanical indicators connected to the loop with a mechanical cable, or the like, depending upon design considerations of the installation.

Fig. 11 shows an alternative method of driving loop antenna 10 by the selective motor relay tube system of the invention. In this case, motor 30' is continually energized by a local battery source 495 for rotation in a given direction. Switch 496 is used to turn the motor on for operation on radio direction indication. Shaft 497 of the motor is coupled to a reversible friction cone drive 500 through slide coupling unit 501. Reversible coupling 500 comprises annular ring 502 secured to rotatably supported loop shaft 11'. Frictional cone members 503 and 504 mounted upon slidable shaft 505 are selectively engageable with friction surface 506 of ring 502. Surface 506 may be of leather, rubber, or other suitable material. Slidable cone shaft 505 is supported by bearings 507 508 and secured at one end to member 510 of coupling 501. Member 510 contains pins 511 engaging openings in coacting coupling member 512 for continuously effecting engagement between slidable shaft 505 and motor shaft 497.

Solenoids 515 and 515' are selectively energized by the motor relay system to attract core member 516 to either the right or left in accordance with the selective firing of tube T or T'. When solenoid 515 is energized, core 516 is attracted to the left, as shown in the diagram, moving pivoted link member 517 to the indicated position and operating coupling member 518 secured to shaft 505 towards the right. When coupling member 518, slidably engaged with link 517, is moved towards the right, cone 503 engages with friction ring 502 to rotate loop 10 in a given direction. When solenoid 515' is energized, core 516 is attracted to the right engaging opposite cone 504 with ring 502 to rotate loop antenna 10 in the opposite direction.

Motor 30' rotates continually and operates the cone drive assembly through shaft 505 to rotate loop 10 in either direction dependent upon which of cone elements 503 or 504 engages with ring 502. Springs 519 and 519' are used to normally mechanically bias lever 517 to the central or neutral position. When neither solenoid 515 or 515' is energized, friction drive arrangement 500 is disengaged and loop antenna 10 remains stationary despite the continuous rotation of motor 30'. Driving arrangement 500 serves as a speed reduction unit between motor 30' and loop 10. It is to be understood that further speed reduction gearing as well as an electromagnetic clutch corresponding to unit 57 previously described may be inserted between loop 10 and the motor.

Selective operation of solenoids 515 and 515' may be effected by substituting them in place of solenoids S and S' in the control system of Figs. 4, 5 and 6. However, their circuit connection in Fig. 11 makes use of local battery energization so that more powerful electromagnetic action may be effected in response to control on relay S or S'. Connections 361 and 361' from electronic control system 45 are made to respective solenoids 515 and 515' instead of to motor armature 370 in the previous forms. Battery 55' is of the same potential as battery 55 and is arranged to normally neutralize or negative the effect of battery 55 upon solenoids 515 and 515' each of which has a return connection to ground.

When relay armature 53 is attracted by solenoid S during firing of control tube T in the previously disclosed manner, connection 361 becomes grounded and current will flow from battery 55' to energize solenoid 515 and attract core 516 to the position illustrated in Fig. 11. The direction of rotation of loop 10 then effected through the continuously rotating motor 30' is such as to rotate it toward the null signal position. Conversely, when tube T' is fired, armature 58 is grounded by solenoid S' to cause energization of solenoid 515' and reverse the rotation of loop 10 in the control action. It is to be understood that motor 30' may be any form of motor, whether direct current or alternating current. It is to be further understood that other arrangements are equally feasible, using different types of motor drives controlled by the electronic control arrangement of the automatic direction indicator system of the invention.

*Automatic piloting system*

The automatic direction indicator system of my present invention may be used to automatically pilot an aircraft in any desired direction with respect to a radio transmitter station. A double-pole double-throw switch 520 is used to disconnect motor relay connections 361, 361' from the loop control motor (30). Connections 361, 361' are those from relay armatures 53 and 58 of the electronic tube control system 45 shown in Figs. 1, 2, 4, 5, and 6. The loop motor connections from switch contacts 521 are those normally connected to rotor 370 of motor 30 as well as electromagnetic clutch 57. They also correspond to the connection made directly to motor 30 shown in Figs. 7 to 10.

When the blades of double-pole switch 520 connect to terminals 521, automatic operation of loop antenna 10 is effected in the manner hereinabove described to keep the loop at the null signal position with respect to the direction of the oncoming radio waves and derive indicator bearings on the radio station. By throwing the blades of switch 520 to the left so that the relay connections 361, 361' are made with terminals 522, a motor similar to motor 30 but located in automatic pilot unit 530 and indicated at 525 is placed under the selective control of the directioinal circuit.

The automatic piloting system of the invention comprises a motor drive arrangement schematically indicated by box 525 directly geared to pulley 526 through shaft 527. The gearing may well be located in region 528 of unit 530. An over-hanging block 529 rotatably supports pulley 526 upon the piloting unit 530. A strap or cable 531 is wrapped around pulley 526. Ends 532 of strap 531 are joined with control cable 535, 535' at corresponding ends 533 thereof. Cables 535 and 535' are connected to opposite sides of an arrangement for operating the rudder of the aircraft to the right or left, similar to the mechanical leverage arrangement which the pilot employs for similar mechanical control of the rudder.

In arranging for the automatic piloting, the pilot initially ascertains the desired direction of flight using the automatic direction indicator system heretofore described by throwing double-pole switch 520 to the right. Should the pilot desire to fly on-course towards radio station, indicator needle 65 will be in position opposite homing index 66 as seen in Fig. 1, and the plane of the loop antenna will be perpendicular to the longitudinal axis of the aircraft and the oncoming radio waves. Should the pilot desire to fly at some angle with respect to the radio station, needle 65 will indicate this angle on indicator 64. After establishing the angular direction of the flight, switch 520 is thrown to the left to disconnect the automatic indicator operation and initiate the automatic pilot. Loop antenna 10 remains in the desired angular position which is its null signal position, and the motor drive connection thereto is deenergized. Automatic pilot unit 530 is placed directly under the control of electronic relay system 45 of the invention.

When the aircraft swerves to the left or right of the desired direction, the loop antenna, which is stationary with respect to the aircraft, receives radio signals and causes either tube T or T' to fire and energize pilot motor 525 in the proper direction to rotate pulley 526 and operate rudder cables 525 and 535' to turn the aircraft rudder and cause the aircraft to correct its course. In this arrangement the aircraft itself is automatically orientated to the predetermined direction. The loop antenna is rotated with respect to the radio wave direction through the turning of the aircraft itself. The aircraft is automatically turned by pilot unit 530 through the rudder until the radio signals picked up by the loop antenna are reduced to practically zero in value and the loop is back in the null signal position with respect to radio station. Pilot motor 525 then becomes deenergized and rudder control cables 435 and 535' remain stationary.

The principle of operation of the automatic piloting arrangement of the invention essentially involves replacing of the loop antenna drive of the automatic indicator system with automatic piloting unit 530. Instead of directly controlling the orientation of the loop antenna to bring it to the null signal position with respect to the transmitter station, the orientation of the aircraft is effected through the rudder or other suitable element such as the ailerons or gyro-pilot, the loop antenna being in a predetermined stationary relation with respect to the aircraft. When the aircraft swerves from the chosen direction a motor drive causes a control action on the rudder, aileron or gyropilot to bring the aircraft back to the predetermined flight direction.

It is to be understood that the predetermined automatic flight direction need not be on-course to the radio station, but is simply dependent upon the angular position of the stationary loop antenna with respect to the axis of the airship. Automatic piloting unit 530 may well contain a motor drive corresponding to motor 30, an electromagnetic clutch corresponding to 57, and reduction gearing corresponding to 56 as shown in the previous figures. It is to be understood that control cables 535, 535' may be secured to different flight direction controls of the aircraft instead of to the rudder. The usual ailerons, gyropilot or the rudder of the aircraft may be directly controlled by control cables 535, 535' to maintain the chosen direction of flight automatically with respect to the radio station tuned-in on the system.

Although I have described preferred arrangements for carrying out the principles of my present invention, it is to be understood that modifications and changes in the illustrated embodiments may be made by those skilled in the art without departing from the broader spirit and scope thereof as defined in the following claims.

What I claim is:

1. In a directional radio system: a non-directional antenna; a rotatable directional antenna; a local source of low frequency current; receiver means including circuit connections to said anquency control signal of phase corresponding to the sense of off-null deviation of said rotatable directional antenna with respect to the oncoming direction of radio waves received by the antennae; reversible motor means; a clutch for coupling said motor means with said directional antenna; and selective electronic control means in circuit with said clutch, and responsive to said current source and control signal in accordance with the relative phase relations thereof for producing a corresponding control current to engage said clutch to rotate said directional antenna until it assumes a substantially null signal relation with respect to the received radio waves, whereupon said control current is rendered ineffective and said clutch is disengaged to abruptly arrest said directional antenna in the null signal position.

2. In a directional radio system: a non-directional antenna; a rotatable directional antenna; a local source of alternating current; receiver means including circuit connection to said antennae and said source for producing an alternating current control signal of phase and amplitude corresponding to the off-null deviation of said directional antenna with respect to the oncoming direction of radio waves received by the antennae; a reversible electric motor; an electromagnetic clutch for coupling said motor with said directional antenna; and selective control means including a pair of electronic tube paths in circuit with said motor and clutch, and responsive to said source and control signal in accordance with the relative phase relations thereof, for producing a corresponding control current to engage said clutch and operate said motor in the direction to rotate said rotatable directional antenna until it assumes a substantially null signal relation with respect to the received radio waves whereupon said clutch is disengaged and said motor is de-energized to abruptly arrest said directional antenna in the null signal position.

3. In a directional radio system; a rotatable directional antenna; a local source of low frequency current; receiver means including circuit connections to said antenna and said source for producing a low frequency control signal of phase and amplitude corresponding to the angular deviation of said antenna with respect to the oncoming direction of radio waves received by the antenna; reversible electric motive means; an electromagnetic clutch for coupling said motive means with said antenna; and selective control means including a pair of electronic tube paths responsive to said source and control signal in accordance with the phase relation and above a predetermined magnitude of the produced control signal, for deriving a corresponding control current; circuit means connected with said control means for utilizing the control current to engage said clutch and operate said motive means in the direction to rotate said antenna until it substantially assumes a predetermined angular relation with respect to the radio waves; said control current being abruptly reduced in value when said control signal falls below said predetermined magnitude to correspondingly disengage said clutch and arrest said antenna in said predetermined angular position, whereby hunting and overdriving of said antenna beyond the predetermined angular position is substantially avoided.

4. In a directional radio system: a rotatable directional antenna; a local source of low frequency current; receiver means including circuit connections to said antenna and source for producing a low frequency control signal of phase and amplitude corresponding to the angular deviation of the antenna with respect to the oncoming direction of radio waves received by the antenna; reversible electric motive means coupled to said rotatable directional antenna; and selective control means including a pair of gaseous electronic tube paths in circuit with said motive means, and said gaseous electronic tube paths being responsive to said local current and the control signal in accordance with the relative phase relations thereof and above a predetermined magnitude of the control signal, for producing a control current of predetermined value to operate said motive means in the direction to rotate said antenna until it substantially assumes a null signal relation with respect to the radio waves whereupon the amplitude of the control signal falls below said predetermined value and said control current abruptly ceases to abruptly arrest said antenna close to said null signal position.

5. A radio direction indicating system comprising: rotatable means for directionally receiving the radio waves; circuit means responsive to radio signals received by said rotatable means for producing an audio frequency control signal of phase corresponding to the angular deviation of said rotatable means with respect to the direction of the oncoming radio waves; motive means for turning said rotatable means in either direction of rotation including a clutch mechanically coupled with said rotatable means; and control means for said motive means including two gaseous electronic paths selectively responsive to said control signal in accordance with the phase relation thereof for producing a control current to engage said clutch and operate said motive means in the direction to rotate said rotatable means until it assumes a predetermined null signal position with respect to said radio waves, the control current abruptly diminishing when said control signal falls below a predetermined value to stop the operation of said motive means and disengage said clutch.

6. In a directional radio system: a rotatable directional antenna; a local source of alternating current; receiver means including circuit connections to said antenna and source for producing a control signal of phase and amplitude corresponding to the off-null deviation of the antenna with respect to the oncoming direction of radio waves received by the antenna; a reversible electric motor; an electromagnetic clutch for coupling said motor with said antenna; and selective control means including a pair of gaseous electronic tube paths in circuit with said receiving means and source, and responsive to said control signal in accordance with its relative phase relation and above a predetermined magnitude thereof, to produce a corresponding control current of predetermined value to engage said clutch and operate said motor in the direction to rotate said antenna until it substantially assumes a null signal relation with respect to the radio waves, whereupon the control signal amplitude falls below said predetermined magnitude to abruptly cut-off the control current and disengage said clutch and motor from said antenna, said antenna being abruptly arrested close to the null signal position, and any tendency thereof towards hunting and overdriving beyond the null signal position is avoided.

7. A system for automatically indicating the direction to a source of electromagnetic waves comprising: a rotatable directional antenna for said waves; circuit means responsive to electromagnetic signals received by said directional antenna for producing an audio frequency control signal of phase and amplitude corresponding to the angular relation of said directional antenna with respect to the direction of arrival of the electromagnetic waves; a motor for operating said directional antenna in either direction of rotation, and an electromagnetic clutch mechanically coupling said motor with said directional antenna; control means for said motor and clutch including two gaseous electronic paths selectively responsive to said control signal in accordance with its phase relation and above a predetermined magnitude thereof for producing a corresponding control current of predetermined value in the responsive path; and a relay associated with each of said paths selectively actuated by the control current for engaging said clutch and operating said motor in a predetermined direction to turn said directional antenna until it assumes a predetermined null signal position with respect to said electromagnetic waves, the control current abruptly ceasing when said antenna reaches to within about 1° of its null signal position to stop the operation of said motor and immediately disengage said clutch for preventing inertial forces of said motor overdriving said antenna beyond its null position.

8. A system for indicating the direction to a transmitter of electromagnetic waves comprising: a rotatable loop antenna; a non-directional receiving antenna; circuit means responsive to electromagnetic signals received by said antennae for producing an audio frequency control signal of phase and amplitude corresponding to the sense of the angular deviation of said loop antenna with respect to the direction to the transmitter of the electromagnetic waves, said circuit means including an automatic amplification gain control arrangement insuring a substantially uniform amplitude of said audio frequency control signal over widely varying conditions of operation of the system; motive means for turning said loop antenna in either direction; and control means for said motive means including two electronic paths selectively responsive to the control signal in accordance with the phase relation and above a predetermined amplitude thereof for operating said motive means in a predetermined direction to turn said loop antenna towards its null signal position with respect to said electromagnetic waves.

9. A system for indicating the direction to a transmitter of electromagnetic waves comprising: a rotatable loop antenna; a non-directional receiving antenna; circuit means responsive to electromagnetic signals received by said antennae for producing an audio frequency control signal of phase and amplitude corresponding to the sense of the angular deviation of said loop antenna with respect to the direction to the transmitter of the electromagnetic waves, said circuit means including an automatic amplification gain control arrangement insuring a substantially uniform amplitude of said audio frequency control signal over widely varying conditions of operation of the system; motive means for turning said loop antenna in either direction; electronic control means for said motive means including two gaseous paths having associated relay means selectively responsive to the control signal in accordance with the phase relation and above a predetermined amplitude thereof for operating said motive means in a predetermined direction to turn said loop antenna towards its null signal position with respect to said electromagnetic waves, the control current abruptly falling to zero value when said control signal falls below said predetermined value to stop the operation of said motive means; and means including circuit connections to said electronic control means for maintaining the operating voltages applied thereto substantially constant and insure the prearranged selective operation of said electronic paths by said control signal.

10. In a radio direction indicator: a rotatable directional antenna; circuit means responsive to radio signals received by said antenna for producing an audio frequency control signal of phase corresponding to the angular position of said directional antenna with respect to the direction to the transmitter of the radio waves; motive means for rotating said directional antenna in either direction; control means selectively responsive to said control signal in accordance with the phase relation thereof for producing a control current to operate said motive means in a predetermined direction to turn said directional antenna towards its null signal position with respect to said radio waves; and means independent of the position of said antenna for interrupting the operation of said motive means at a regular frequency for more effectively controlling said motive means.

11. In a radio direction indicator: a rotatable directional antenna; a non-directional receiving antenna; circuit means responsive to radio signals received by said antennae for producing an audio frequency control signal of phase and amplitude corresponding to the angular relation of said directional antenna with respect to the direction to the transmitter of the radio waves; a motor for rotating said directional antenna in either direction; control means selectively responsive to said control signal in accordance with the phase relation thereof for producing a control current to operate said motor in a predetermined direction to turn said directional antenna towards its null signal position with respect to said radio waves; and means independent of the position of said rotatable antenna for interrupting the energization of said motor at a predetermined number of intervals per second substantially different than the frequency of the control current to more effectively control said motor.

12. A system for automatically indicating the direction to a source of electromagnetic waves comprising: a rotatable directional antenna; circuit means responsive to electromagnetic signals received by said directional antenna for producing a control signal of the order of 100 cycles per second and of phase corresponding to the sense of the angle between the plane of said directional antenna and the direction of said waves; motive means for rotating said directional antenna in either direction; control means for said motive means including two electronic paths selectively responsive to the control signal in accordance with the phase relation thereof for producing a control current of predetermined value in the responsive path to operate said motive means in the direction to rotate said directional antenna towards its null signal position with respect to said electromagnetic waves; and means independent of the position of said antenna for interrupting the operation of said responsive path at a predetermined number of intervals per second substantially lower than said control current frequency to effect more rigid control of said motive means.

13. A system for automatically indicating the direction to a transmitter of radio waves comprising: rotatable antenna means for directionally receiving the radio waves; circuit means responsive to radio signals received by said antenna means for producing a control signal of phase corresponding to the off-null position of said antenna with respect to the direction of the oncoming radio waves; motive means for rotating said antenna means in either direction; control means for said motive means including two electronic paths selectively responsive to said control signal in accordance with the phase relation thereof for producing a control current of predetermined value to operate said motive means in the direction to turn said antenna means towards its null signal position with respect to the radio waves; and means effective during the response of one of said paths for substantially increasing the sensitivity of the other of said paths to actuation by a control signal of opposite phase, whereby stable null signal positioning of said antenna means is effected.

14. In a directional radio system: a rotatable directional antenna; a local source of low frequency current; receiver means including circuit connections to said antenna and source for producing a low frequency control signal of phase and amplitude corresponding to the angular deviation of the antenna with respect to the oncoming direction of radio waves received by the antenna; reversible electric motive means coupled to said rotatable directional antenna; and selective control means including a pair of gaseous electronic tube paths in circuit with said motive means, and responsive to said local current and the control signal in accordance with the relative phase relations thereof and above a predetermined magnitude of the control signal, for producing a control current of predetermined value to operate said motive means in the direction to rotate said antenna towards a null signal relation with respect to the radio waves whereupon the amplitude of the control signal falls below said predetermined value and said control current abruptly ceases; and means in circuit with said electronic paths, effective during the response of one path to a control signal, for substantially increasing the sensitivity of response of the other path to a control signal of the opposite phase.

15. A system for automatically indicating the direction to a transmitter of radio waves comprising: rotatable antenna means for directionally receiving the radio waves; circuit means responsive to radio signals received by said antenna means for producing a control signal of phase corresponding to the off-null position of said antenna with respect to the direction of the oncoming radio waves; motive means for rotating said antenna means in either direction; control means for said motive means including two gaseous electronic paths selectively responsive to said control signal in accordance with the phase relation and above a predetermined magnitude thereof for producing a control current in the responsive tube to operate said motive means in the direction to turn said antenna means towards its null signal position with respect to the radio waves; and biasing means responsive to the responsive tube for substantially increasing the sensitivity of the other tube to actuation by a control signal of opposite phase to that controlling the actuated tube whereby hunting of said motive means is substantially suppressed and stable null signal positioning of said antenna means by said motive means is effected accurate to within 1° of an arc.

16. In a directional radio system: a rotatable directional antenna; a local source of alternating current; receiver means including circuit connections to said antenna and source for producing a control signal of phase and amplitude corresponding to the off-null deviation of the antenna with respect to the oncoming direction of radio waves received by the antenna; a reversible electric motor; an electromagnetic clutch for coupling said motor with said antenna; and selective control means including a pair of gaseous electronic tube paths in circuit with said receiving means and source, and responsive to said control signal in accordance with its relative phase relation and above a predetermined magnitude thereof, to produce a corresponding control current of predetermined value to engage said clutch and operate said motor in the direction to rotate said antenna towards a null signal relation with respect to the radio waves whereupon the control signal amplitude falls below said predetermined magnitude to abruptly cut-off the control current and disengage said clutch and motor from said antenna; and means in circuit with said electronic paths, operative through the response of one path to a control signal, for substantially increasing the sensitivity of response of the other path to a control signal of the opposite phase, whereby stable null signal positioning of said antenna is effected.

17. In a directional radio system: a rotatable directional antenna; receiver means including circuit connections to said antenna for producing a control signal of phase corresponding to the sense of off-null deviation of the antenna with respect to the oncoming direction of radio waves received by the antenna; reversible electric motor means coupled to said antenna; selective control means in circuit with said motor means and responsive to said control signal in accordance with the phase relation thereof for producing a corresponding control current to operate said motor means to rotate said antenna towards its null signal position with respect to the radio waves; and means in circuit with said control means, effective during the response of said control means to a control signal, for substantially increasing its normal sensitivity of response to a control signal of the opposite phase, for effecting stable null signal positioning of the antenna.

WILLIAM P. LEAR.

CERTIFICATE OF CORRECTION.

Patent No. 2,308,521. January 19, 1943.

WILLIAM P. LEAR.

It is hereby certified that error appears in the printed specification of the above numbered patent requiring correction as follows: Page 18, second column, lines 48 and 49, claim 1, for the word and syllables "said anquency" read --said antennae and said source for producing a low frequency--; and that the said Letters Patent should be read with this correction therein that the same may conform to the record of the case in the Patent Office.

Signed and sealed this 6th day of April, A. D. 1943.

(Seal)

Henry Van Arsdale,
Acting Commissioner of Patents.